(12) United States Patent
Yoshikawa et al.

(10) Patent No.: US 6,929,373 B2
(45) Date of Patent: Aug. 16, 2005

(54) REFLECTION OPTICAL DEVICE AND IMAGING APPARATUS COMPRISING IT, MULTI-WAVELENGTH IMAGING APPARATUS, AND VEHICLE MOUNTED MONITOR

(75) Inventors: Motonobu Yoshikawa, Osaka (JP); Yoshiharu Yamamoto, Toyonaka (JP); Daizaburou Matsuki, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 72 days.

(21) Appl. No.: 10/332,799

(22) PCT Filed: Apr. 10, 2002

(86) PCT No.: PCT/JP02/03566

§ 371 (c)(1),
(2), (4) Date: Jan. 9, 2003

(87) PCT Pub. No.: WO02/084364

PCT Pub. Date: Oct. 24, 2002

(65) Prior Publication Data

US 2003/0147163 A1 Aug. 7, 2003

(30) Foreign Application Priority Data

Apr. 11, 2001 (JP) ........................................ 2001-113114

(51) Int. Cl.[7] ................................................. G02B 5/10
(52) U.S. Cl. ....................................................... 359/858
(58) Field of Search ................................ 359/850, 855, 359/857, 858, 831, 833, 834–837

(56) References Cited

U.S. PATENT DOCUMENTS

| | | |
|---|---|---|
| 3,811,749 A | 5/1974 | Abel |
| 4,733,955 A | 3/1988 | Cook |
| 4,834,517 A | 5/1989 | Cook |
| 5,253,005 A | 10/1993 | Koyama et al. |
| 5,331,470 A | 7/1994 | Cook |
| 5,661,610 A | 8/1997 | Pasternak |
| 5,841,574 A | 11/1998 | Willey |
| 5,847,879 A | 12/1998 | Cook |
| 5,867,329 A | 2/1999 | Justus et al. |
| 5,993,010 A | 11/1999 | Ohzawa et al. |
| 6,259,558 B1 * | 7/2001 | Fischer et al. .............. 359/429 |
| 6,268,963 B1 * | 7/2001 | Akiyama .................... 359/631 |
| 6,324,012 B1 | 11/2001 | Aratani et al. |

FOREIGN PATENT DOCUMENTS

| | | |
|---|---|---|
| EP | 0 025 188 | 3/1981 |
| EP | 0 601 871 | 6/1994 |

(Continued)

OTHER PUBLICATIONS

Maejima et al., "Germanium for Infrared Optics", Tokyo Denshi Yakin Co., Ltd. (1990); 17:41–47.

Primary Examiner—Euncha P. Cherry
(74) Attorney, Agent, or Firm—Hamre, Schumann, Meuller & Larson, P.C.

(57) ABSTRACT

Reflection surfaces (2, 3) and a diaphragm (1) for limiting light fluxes disposed between an object and the reflection surface (2) that is located closest to the object are provided. At least one surface of the plural reflection surfaces (2, 3) has an anamorphic shape. The reflection surfaces (2, 3) are disposed eccentrically. There is provided a light shielding member (6) for blocking light fluxes passing through the diaphragm (1) and reaches the range to be imaged on an image surface (4) without being reflected by the reflection surfaces (2, 3). Since the shielding member (6) is disposed, unnecessary light fluxes do not reach the image surface directly. Since there is no refractive transmission plane, also unnecessary light reflected by the transmission plane does not reach the image surface.

32 Claims, 15 Drawing Sheets

FOREIGN PATENT DOCUMENTS

| | | |
|---|---|---|
| EP | 0 656 552 | 6/1995 |
| EP | 0 689 075 | 12/1995 |
| EP | 0 730 169 | 9/1996 |
| EP | 0 730 183 | 9/1996 |
| EP | 0 732 168 | 9/1996 |
| EP | 0 880 032 | 11/1998 |
| EP | 0 921 427 | 6/1999 |
| EP | 1 160 610 | 12/2001 |
| JP | 54-42674 | 12/1979 |
| JP | 57-37371 | 3/1982 |
| JP | 62-164010 | 7/1987 |
| JP | 63-503097 | 11/1988 |
| JP | 64-88414 | 4/1989 |
| JP | 1-502461 | 8/1989 |
| JP | 3-125573 | 5/1991 |
| JP | 3-274971 | 12/1991 |
| JP | 4-318697 | 11/1992 |
| JP | 5-288899 | 11/1993 |
| JP | 6-29928 | 2/1994 |
| JP | 6-273671 | 9/1994 |
| JP | 8-292371 | 11/1996 |
| JP | 2598501 | 1/1997 |
| JP | 2716933 | 11/1997 |
| JP | 10-206986 | 8/1998 |
| JP | 10-221603 | 8/1998 |
| JP | 10-333040 | 12/1998 |
| JP | 10-339842 | 12/1998 |
| JP | 11-14906 | 1/1999 |
| JP | 11-132860 | 5/1999 |
| JP | 11-168680 | 6/1999 |
| JP | 2000-98476 | 4/2000 |
| WO | WO 87/06359 | 10/1987 |
| WO | WO 88/05552 | 7/1988 |
| WO | WO 90/09864 | 9/1990 |
| WO | WO 00/48033 | 8/2000 |

\* cited by examiner

REFLECTION OPTICAL DEVICE AND IMAGING APPARATUS COMPRISING IT, MULTI-WAVELENGTH IMAGING APPARATUS, AND VEHICLE MOUNTED MONITOR

TECHNICAL FIELD

The present invention relates to an optical system and an image pickup device in each of which a reflection surface is used, and particularly to an image pickup device using infrared rays.

BACKGROUND ART

Recently, research has been carried out on reflection optical devices mainly for the purpose of detection and image pickup of infrared rays. In particular, for instance, JP 63(1988)-503097A, JP 1(1989)-502461A, JP 6(1994)-273671A, etc. propose various optical devices in which reflection surfaces are disposed eccentrically so that light fluxes are not blocked by the reflection surfaces on their way but are imaged effectively.

Furthermore, reflection optical devices in which a reflection surface is formed to be a free-form surface, though not for use with infrared rays, is proposed by JP 8(1996)-292371A, for instance. However, in any devices, specifications such as brightness, resolution, distortion, an angle of view, etc. do not reach the practical level. In order to satisfy the practical level of specifications, we have proposed a reflection optical system formed of plural free-form surface mirrors to date (International Publication Number WO 00/48033).

In a conventional optical system using not a reflection optical system but instead a transmission surface, unnecessary light, which is released from a place other than an object and passes through a diaphragm, does not directly reach a pickup range in the image surface. However, there has been a problem in that a ghost image is generated, that is, unnecessary light reflected by the transmission surface reaches the image surface. Furthermore, in the case where an extremely bright light source (for example, sun, etc.) other than a pictured object is present near the object to be picked up, a ghost image commonly is generated. Such a ghost image can be prevented from being generated by forming an antireflection film, etc. on the transmission surface, but it is expensive and the cost rises.

However, the conventional reflection optical system as mentioned above has a problem in that unnecessary light released from a place other than an object passes through a diaphragm and reaches the pickup range of the image surface without being reflected by the reflection surface. This problem is a new problem, that is, such a problem does not occur in a lens system using a conventional transmission surface or a reflection optical system that is not practical for the purpose of image pickup. Therefore, in the reflection optical system, any techniques for preventing such an unnecessary light from reaching the image surface have not been proposed particularly.

DISCLOSURE OF INVENTION

It is an object of the present invention to solve the above-mentioned problems and to provide a reflection optical device having a light shielding member in the reflection optical system, thereby improving the optical performance, realizing brightness and a wide angle of view, and capable of preventing a ghost image from being generated, an image pick up device using the same, a multiwavelength image pickup device and a vehicle-mounted monitoring device at low cost.

In order to achieve the above-mentioned object, a first reflection optical device of the present invention includes plural reflection surfaces and a diaphragm for limiting light fluxes, which is disposed between an object and a reflection surface that is located closest to the object among the plural reflection surfaces. At least one of the plural reflection surfaces has an anamorphic shape, and the plural reflection surfaces are disposed eccentrically and form light fluxes released from an object having a size not a spot into an image on an image surface. The reflection optical device comprises a light shielding member for blocking light fluxes released from a place other than the object, which pass through the diaphragm and reach a pickup range on the image surface without being reflected by the plural reflection surfaces.

With such a reflection optical device, since the optical system is formed of the reflection surfaces without using a transmission surface and the reflection surfaces are disposed eccentrically, effective light fluxes can be guided to the image surface without being blocked. Furthermore, since the light shielding member is provided, unnecessary light fluxes do not directly reach the image surface. In addition, since there is not a refractive transmission surface, unnecessary light reflected by the transmission surface also does not reach the image surface. Therefore, a ghost image easily can be prevented from being generated.

In the above-mentioned reflection optical device, it is preferable that the light shielding member is disposed between the object and the diaphragm. With such a reflection optical device, since unnecessary light fluxes reliably can be blocked before entering the inside of the reflection optical system, a ghost image easily can be prevented from being generated.

Furthermore, it is preferable that the light shielding member is a plate-shaped member having one end located at the side of the diaphragm and the other end extending to the object. With such a reflection optical device, it is possible to provide a light shielding member at low cost.

Furthermore, it is preferable that the light shielding member has an inclined surface for limiting light fluxes released from the object in the direction in which the light fluxes travel from the side of the object to the side of the diaphragm so that effective light fluxes, which form an image on the image surface, are not blocked.

Furthermore, it is preferable that the light shielding member is integrated with the diaphragm. With such a reflection optical device, a process of disposing the light shielding member in the diaphragm part is omitted, thus simplifying the manufacture and reducing the cost.

Furthermore, it is preferable that the plural reflection surfaces and the image surface are disposed inside the housing; the diaphragm is an aperture provided in the housing; and the light shielding member is disposed outside the housing. With such a reflection optical device, unnecessary light fluxes are blocked before entering the housing, and therefore unnecessary light fluxes reliably can be prevented from entering the optical system.

Furthermore, it is preferable that the number of the plural reflection surfaces is two; the shape of the two reflection surfaces is anamorphic; and when the two reflection surfaces are referred to as a first reflection surface and a second reflection surface in that order from the side of the object, the light shielding member is disposed in a space surrounded by an optical axis extending from the vertex of the first reflection surface to the vertex of the second reflection surface, an optical axis extending from the vertex of the second reflection surface to the center of the image surface, and a line connecting the center of the image surface and the vertex of the first reflection surface in a plane including the center of the image surface and the vertices of the two reflection surfaces. With such a reflection optical device, a space for blocking unnecessary light fluxes without blocking effective light fluxes is found in the optical system and the light shielding member is disposed in this space. Therefore, it is possible to prevent a ghost image from being generated while miniaturizing the device, thus enabling an excellent image pickup.

Furthermore, it is preferable that the number of the plural reflection surfaces is four; and when the four reflection surfaces are referred to as a first reflection surface, a second reflection surface, a third reflection surface and a fourth reflection surface in that order from the side of the object, the light shielding member is disposed in a space surrounded by an optical axis extending from the vertex of the second reflection surface to the vertex of the third reflection surface, an optical axis extending from the vertex of the third reflection surface to the vertex of the fourth reflection surface, and a line connecting the vertex of the second reflection surface and the vertex of the fourth reflection surface in a plane including the center of the image surface and the vertices of the four reflection surfaces. With such a reflection optical device, a space for blocking unnecessary light fluxes without blocking effective light fluxes is found in the optical system and the light shielding member is disposed in this space. Therefore, it is possible to prevent a ghost image from being generated while miniaturizing the device, thus enabling an excellent image pickup.

Furthermore, it is preferable that the outer shape of the light shielding member is adjusted so as not to block the effective light fluxes that form an image on the image surface.

Furthermore, it is preferable that the following relationship is satisfied:

$3 \leq Wy \leq 30$ where Wy (deg) denotes a half angle of view in the Y direction in a plane including vertices of the reflection surface in the rectangular coordinate system (X, Y) in which the X direction is a direction perpendicular to a plane including the center of the image surface and the vertices of the reflection surfaces and the Y direction is a tangential direction of the plane including vertices of the reflection surface at the vertex included in this plane. When the angle of view is larger than the upper limit of this conditional relationship, it becomes difficult to correct aberration. On the other hand, when it is smaller than the lower limit, it is difficult to use the device as an image pickup device.

Furthermore, it is preferable that the following relationship is satisfied $0.95 \leq Fno. \leq 3.1$ where Fno. denotes an open F value in a plane including the vertices of the four reflection surfaces. When the brightness is higher than the upper limit of this conditional relationship, it becomes difficult to achieve MTF of 20% or more at 20 (l.p/mm) due to the influence of the refraction in the case where the far-infrared region with wavelength of 10 $\mu$m is picked up. On the other hand, when the brightness is lower than the lower limit it is difficult to correct aberration.

Furthermore, it is preferable that the number of the plural reflection surfaces is four and the following relationships are satisfied:

$0.95 \leq Fno. \leq 3.1$ $3 \leq Wy < 10$ where Fno. denotes an open F value in a plane including the vertices of the four reflection surfaces, and Wy (deg) denotes a half angle of view in the Y direction in a plane including the vertices of the reflection surfaces in the rectangular coordinate system (X, Y) in which the X direction is a direction perpendicular to a plane including the center of the image surface and the vertices of the reflection surfaces and the Y direction is a tangential direction at a vertex included in this plane. With such a reflection optical device, it is possible to realize an extremely bright reflection optical device although the angle of view is narrow. Furthermore, the effect of blocking unnecessary light by the light shielding member is added, and thereby excellent telescopic image pickup can be realized. In the relationship of Fno., when the value is larger than the upper limit, it becomes difficult to improve the resolution due to the influence of the refraction in the case of picking up an image in the far-infrared region and when it is smaller than the lower limit it becomes difficult to correct aberration.

Furthermore, it is preferable that the number of the plural reflection surfaces is four and the following relationships are satisfied:

$1.1 \leq Fno. \leq 3.1$ $10 \leq Wy < 20$ where Fno. denotes an open F value in a plane including the vertices of the four reflection surfaces, and Wy (deg) denotes a half angle of view in the Y direction in a plane including the vertices of the reflection surfaces in the rectangular coordinate system (X, Y) in which the X direction is a direction perpendicular to a plane including the center of the image surface and the vertices of the reflection surfaces and the Y direction is a tangential direction at a vertex included in this plane. With such a reflection optical device, it is possible to realize a reflection optical device that is extremely bright although the angle of view is narrow. Furthermore, the effect of blocking unnecessary light by the light shielding member is added, and thereby a slightly telescopic image pickup having general versatility can be realized. In the relationship of Fno., when the value is larger than the upper limit, it becomes difficult to improve the resolution due to the influence of the refraction in the case of picking up an image in the far-infrared region and when it is smaller than the lower limit it becomes difficult to correct aberration.

Furthermore, it is preferable that the number of the plural reflection surfaces is four and the following relationships are satisfied:

$1.4 \leq Fno. \leq 3.1$ $20 \leq Wy < 30$ where Fno. denotes an open F value in a plane including the vertices of the four reflection surfaces, and Wy (deg) denotes a half angle of view in the Y direction in a plane including the vertices of the reflection surfaces in the rectangular coordinate system (X, Y) in which the X direction is a direction perpendicular to a plane including the center of the image surface and the vertices of the reflection surfaces and the Y direction is a tangential direction at a vertex included in this plane. With such a reflection optical device, it is possible to realize a reflection optical device that is extremely bright although the angle of view is narrow. Furthermore, the effect of blocking unnecessary light by the light shielding member is added, and thereby a slightly telescopic image pickup having general versatility can be realized. In the relationship of Fno., when the value is larger than the upper limit, it becomes difficult to improve the resolution due to the influence of the refraction in the case of picking up an image in the far-infrared region and when it is smaller than the lower limit, it becomes difficult to correct aberration.

Furthermore, in the above-mentioned reflection optical devices in which Fno. is limited, it is preferable that the relationship: Fno.$\leq$1.9 is satisfied. With such a reflection optical device, for example, even if there is an influence of the refraction when the far-infrared region with wavelength of 10 $\mu$m is picked up, it is possible to achieve MTF of 20% or more at 35 (l.p/mm).

Furthermore, in the above-mentioned reflection optical devices in which Fno. is limited, it is preferable that the relationship: Fno.$\leq$1.6 is satisfied. With such a reflection optical device, for example, it is possible to achieve MTF of 20% or more at 40 (l.p/mm).

Furthermore, it is preferable that the shape of at least one surface of the plural reflection surfaces is a free-form surface that does not have a rotational central axis. By using the free-form surface, more practical optical performance can be obtained.

Next, the image pickup device of the present invention includes the above-mentioned reflection optical device and a detector for converting light intensity into an electrical signal. According to such an image pickup device, since the reflection optical device of the present invention is used, it is possible to realize an image pickup device that prevents a ghost image from being generated while improving the optical performance.

In the above-mentioned image pickup device, it is preferable that the detector is a two-dimensional image pickup element. With such an image pickup device, it is possible to obtain a picture image having a wide angle of view and high resolution.

Furthermore, it is preferable that the detector has sensitivity with respect to light beams in the infrared region.

Next, a first multiwavelength image pickup device of the present invention includes the above-mentioned reflection optical device and a detector having sensitivity with respect to light beams in plural different wavelength bands. According to the above-mentioned multiwavelength image pickup device, since the reflection optical device of the present invention is used, it is possible to obtain a multiwavelength image pickup device that prevents a ghost image from being generated while improving the optical performance. Furthermore, since the optical system is formed only of reflection surfaces, it can be used in any of regions from the infrared region (wavelength: 3–5 $\mu$m or 8–12 $\mu$m) to the visible region (wavelength: 400–750 nm), and the ultraviolet region (wavelength: 200–400 nm). Furthermore, by combining the optical system with a detector having sensitivity in plural wavelength regions, it is possible to pick up picture images in plural wavelength bands with one optical system simultaneously. For example, if the detector has sensitivity with respect to light beams of both infrared region and visible region, the visible region suitable for image pickup in the daytime and infrared region suitable for image pickup at night become possible.

In the first multiwavelength image pickup device, it is preferable that the detector has a light flux dividing member for dividing light fluxes into light fluxes in different wavelength bands and detection surfaces corresponding to the plural divided wavelength bands. With such a multiwavelength image pickup device, it is possible to pick up images in plural wavelength bands by one optical system simultaneously. For example, if the detector has sensitivity with respect to light beams of both infrared region and visible region, the visible region suitable for image pickup in the daytime and infrared region suitable for image pickup at night become possible.

Next, a second multiwavelength image pickup device includes the above-mentioned reflection optical device and the detector having plural regions, which have sensitivity with respect to light beams in different wavelength bands, in the same detecting plane. According to the above-mentioned multiwavelength image pickup device, it is possible to pick up plural images with one optical system and one detection element simultaneously.

Next, a first vehicle-mounted monitoring device of the present invention includes the above-mentioned image pickup device and a display for conveying a picked-up picture image to a driver. According to the above-mentioned vehicle-mounted monitoring device, since a display is provided in addition to the image pickup device of the present invention, it is possible to obtain location information such as vehicles going in front, people, etc. with high precision.

Next, a second vehicle-mounted monitoring device of the present invention includes the above-mentioned multiwavelength image pickup device and a display for conveying a picked-up picture image to a driver. According to the above-mentioned vehicle-mounted monitoring device, since a display is provided in addition to the image pickup device of the present invention, it is possible to obtain location information such as vehicles going in front, people, etc. with high precision.

BEST MODE FOR CARRYING OUT THE INVENTION

Hereinafter, the present invention will be explained by way of an embodiment with reference to the accompanying drawings.

(First Embodiment)

Figure 1:
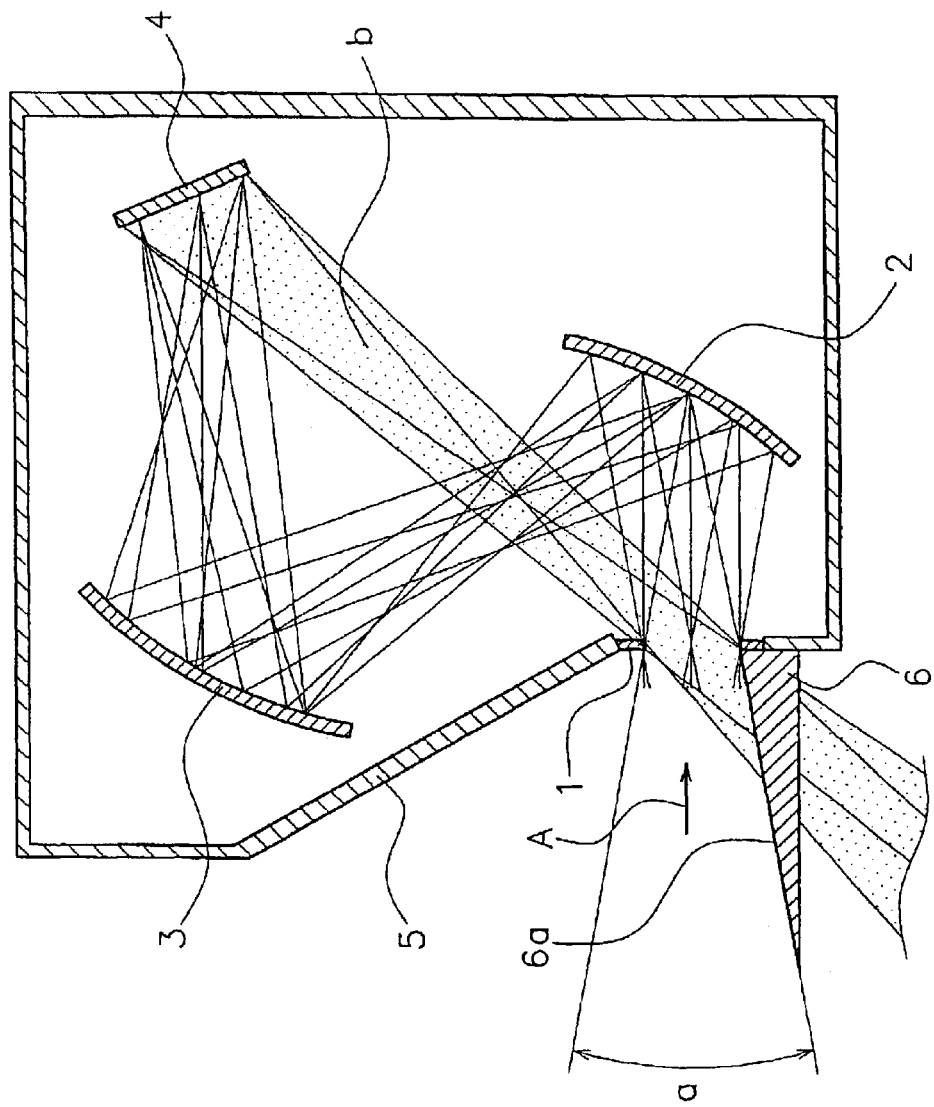
FIG. 1 is a view showing a configuration of a reflection optical device according to a first embodiment of the present invention.

FIG. 1 is a view showing a configuration of a reflection optical device according to the first embodiment of the present invention. In FIG. 1, reference numeral 1 denotes a diaphragm, 2 denotes a first mirror, 3 denotes a second mirror, 4 denotes an image surface, 5 denotes a housing and 6 denotes a light shielding plate. Light fluxes released from the object travel in the direction shown by an arrow A, are limited by the diaphragm 1 and incident in the housing 5. These incident light fluxes are reflected by the first mirror 2 and the second mirror 3, which are disposed obliquely with respect to the optical axis, that is, disposed eccentrically, and form an image on the image surface 4. In other words, in the reflection optical device of this embodiment, as shown in FIG. 1, light fluxes released from an object having a size not a spot are imaged to form an image having a size on the image surface 4 (the same is true in the following embodiments).

In order to block outside light from a place other than the image pickup range a, an optical system including the first mirror 2 and the second mirror 3 and the image surface 4 are surrounded by the housing 5. In this embodiment, the light shielding plate 6 that is a means for blocking light is further provided. The light shielding plate 6 is disposed in front of the diaphragm 1 (at the side of the object with respect to the diaphragm 1) with one end located at the side of the diaphragm 1 and the other end extending to the side of the object. Furthermore, in order not to shield effective light fluxes released from the object and forming an image on the image surface 4, an inclined face 6a disposed so that the light fluxes released from the object are limited as traveling from the side of the object to the diaphragm 1. Also in the embodiments shown with reference to FIGS. 6 and 12 to 14, such a light shielding plate is disposed. Furthermore, also in the embodiments with reference to each figure, the light shielding plates 15 and 21 have inclined planes 15a and 21a, respectively.

Herein, a region b shows an unnecessary light flux transmission region. In the case where the light shielding member 6 is not provided, unnecessary light fluxes entering from the diaphragm 1 pass through the unnecessary light flux transmission region b and directly reach the image surface 4. In this embodiment, since the light shielding plate 6 is disposed in front of the diaphragm 1, the unnecessary light fluxes are shielded before entering the housing 5. Thus, the unnecessary light fluxes are prevented from entering the inside of the optical system reliably.

That is, the light shielding plate 6 is disposed so as to block the unnecessary light fluxes released from a place other than the object and reaching the image pickup region on the image surface 4 without being reflected by the first mirror 2 and the second mirror 3.

The surface shape of the first mirror 2 and the second mirror 3 is an anamorphic surface, in which the normal line at the vertex is not a rotationally symmetric axis unlike a general spherical surface and an axially symmetric non-spherical surface. If the reflection surface of the anamorphic surface is assumed to be a free-form surface, the degree of freedom of design increases, so that the angle can be made wider and the optical performance can be improved.

Figure 2:
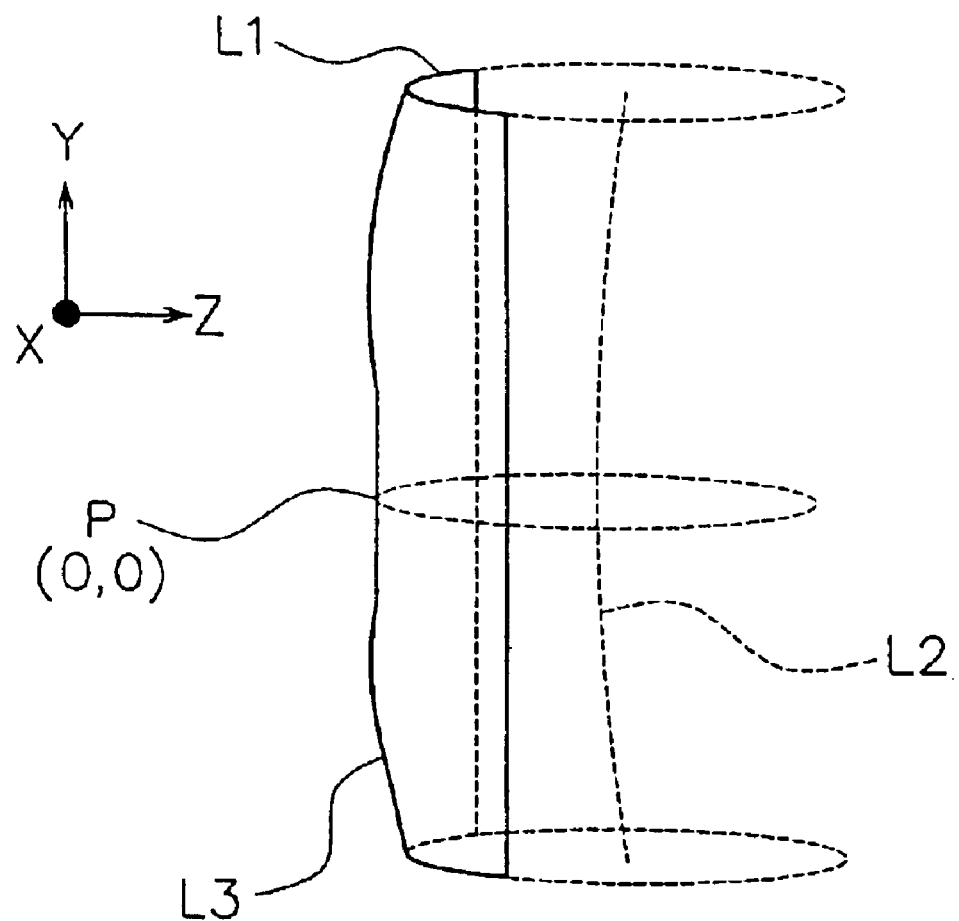
FIG. 2 is a perspective view to explain the shape of a reflection surface.

The free-form surface herein denotes a surface without having a rotational central axis possessed by a toric surface, etc. (the same is true in the following embodiments). An example of the free-form surface includes a curved-axis Y toric surface as shown in FIG. 2. The curved-axis Y toric surface is a surface in which a line connecting the centers of the radius of curvature of the cross section in the X direction of each Y coordinate is a curved line in the rectangular coordinate system (X, Y) in which the X direction is a direction perpendicular to a plane including the center of the image surface and the vertices of the reflection surfaces and the Y direction is a tangential direction at a vertex included in this plane. In FIG. 2, L1 denotes a cross-sectional shape (arc) in the X direction, L2 denotes a line connecting the centers of the radius of curvatures of the cross-sectional shape (not an arc-shaped curved line) in the X direction, L3 denotes a shape (not arc) of the surface in the Y direction and P denotes a vertex. Furthermore, there may be an X toric surface in which X and Y are replaced by each other.

With the premise that the vertex of the plane is the origin and the direction in which an incident light flux travels forward is positive, the curved-axis Y toric surface is expressed as a sag amount Z (mm) from the vertex at a point with the coordinates x (mm) and y (mm), which is expressed by Formulae (1) through (5).

$$Z = M(y) + S(x, y) \qquad \text{Formula (1)}$$

$$M(y) = \frac{\left(\frac{y^2}{Rdy}\right)}{1 + \sqrt{1 - \left(\frac{y}{Rdy}\right)^2}} +$$

$$YAD\ y^4 + YAE\ y^6 + YAF\ y^8 + YAG\ y^{10} +$$
$$YAOD\ y^3 + YAOE\ y^5 + YAOF\ y^7 + YAOG\ y^9$$

$$S(x, y) = \frac{\frac{x^2}{Rds} - 2x \cdot \sin\theta}{\cos\theta + \sqrt{\cos^2\theta - \left(\frac{x}{Rds}\right)^2 + \frac{2x \cdot \sin\theta}{Rds}}} + \qquad \text{Formula (2)}$$

$$XAD\ x^4 + XAE\ x^6 + XAF\ x^8 + XAG\ x^{10}$$

Formula (3)

$$Rds = Rdx(1 + BCy^2 + BDy^4 + BEy^6 + BFy^8 + BGy^{10} + BOCy + BODy^3 + BOEy^5 + BOFy^7 + BOGy^9) \qquad \text{Formula (4)}$$

$$\theta = QCy^2 + QDy^4 + QEy^6 \qquad \text{Formula (5)}$$

In the above-mentioned formulae, M(y) denotes an expression that expresses a non-arc as Y direction cross-sectional shape including the vertex. Rdy (mm) denotes a radius of curvature in the Y direction, and YAD, YAE, YAF and YAG denote even-order constants contributing in the Y direction respectively and YAOD, YAOE, YAOF, and YAOG denote odd-order constants, respectively. S(x, y) denotes an expression that expresses an X direction cross-sectional shape. Rds denotes a function that expresses a radius of curvature in the X direction at each Y coordinate; Rdx (mm) denotes a radius of curvature in the X direction at the center; BC, BD, BE, BF and BG denote even-order constants, respectively; BOC, BOD, BOE, BOF and BOG denote odd-order constants, respectively; XAD, XAE, XAF and XAG denote even-order constants contributing in the X direction; θ (rad) is a function that determines a twist angle; and QC, QD and QE denote twist coefficients, respectively.

With the premise that the vertex of the plane is the origin and the direction in which an incident light flux travels forward is positive, the curved-axis X toric surface is expressed as a sag Z (mm) from the vertex at a point with the coordinates x (mm) and y (mm), which is expressed by Formulae (6) through (10).

$$Z = M(x) + S(x, y) \quad \text{Formula (6)}$$

$$M(x) = \frac{\left(\frac{x^2}{Rdx}\right)}{1 + \sqrt{1 - \left(\frac{x}{Rdx}\right)^2}} + XAD\ x^4 + XAE\ x^6 + XAF\ x^8 + XAG\ x^{10}$$

$$S(x, y) = \frac{\frac{y^2}{Rds} - 2y \cdot \sin\theta}{\cos\theta + \sqrt{\cos^2\theta - \left(\frac{y}{Rds}\right)^2 + \frac{2y \cdot \sin\theta}{Rds}}} +$$
$$YAD\ y^4 + YAE\ y^6 + YAF\ y^8 + YAG\ y^{10} +$$
$$YAOD\ y^3 + YAOE\ y^5 + YAOF\ y^7 + YAOG\ y^9$$

$$Rds = Rdy(1 + BCx^2 + BDx^4 + BEx^6 + BFx^8 + BGx^{10} + BOCx + BODx^3 + BOEx^5 + BOFx^7 + BOGx^9) \quad \text{Formula (9)}$$

$$\theta = QCx^2 + QDx^4 + QEx^6 \quad \text{Formula (10)}$$

In the above-mentioned formulae, M(x) denotes an expression that expresses a non-arc as an X-direction cross-sectional shape including the vertex, S (x, y) denotes an expression that expresses a Y direction cross-sectional shape. Rdx (mm) denotes a radius of curvature in the X direction, XAD, XAE, XAF and XAG denote even-order constants contributing in the X-direction, respectively; and Rds denotes a function that expresses a radius of curvature in the Y direction at each x-coordinate, Rdy (mm) denotes a radius of curvature in the Y direction at the center; BC, BD, BE, BF and BG denote even-order constants, respectively; BOC, BOD, BOE, BOF and BOG denote odd-order constants, respectively; YAD, YAE, YAF and YAG denote even-order constants, respectively; YAOD, YAOE, YAOF and YAOG denote odd-order constants, respectively; θ (rad) denotes a function that determines a twist angle of the surface; and QC, QD and QE denote twist coefficients, respectively.

Furthermore, when the half angle of view (deg) in the Y direction in the plane including vertices of the reflection surface is Wy, Wy preferably satisfies the following Formula (11). When the angle of view is larger than the value expressed by Formula (11), it is difficult to correct aberration. When the angle is smaller than the lower limit, it becomes difficult to use the device as a pickup device.

$$3 \leq Wy \leq 30 \quad \text{Formula (11)}$$

Next, Table 1 and Table 2 show specific examples of a number of the embodiments. In each table, M1 denotes the first mirror 2 and M2 denotes the second mirror 3. In Example 1 of Table 1, both M1 and M2 are curved-axis Y toric surfaces and in Example 2 of Table 2, both M1 and M2 are curved-axis X toric surfaces, and the shape of the diaphragm is circular in both embodiments.

Furthermore, Wy denotes a half angle of view (deg) in the Y direction in the plane including vertices of the reflection surface, Wx denotes a half angle of view (deg) in the X direction in the plane including vertices of the reflection surface, efy denotes a focal length (mm) of the entire system in the Y direction, efx denotes a focal length (mm) of the entire system in the X direction, Fny denotes an F value in the Y direction, Fnx denotes an F value in the X direction, d1 denotes a distance (mm) from the center of the diaphragm 1 to the vertex of the first mirror 2, d2 denotes a distance (mm) from the vertex of the first mirror 2 to the vertex of the second mirror 3, d3 denotes a distance (mm) from the vertex of the second mirror 3 to the center of the image surface 4, α1 denotes an angle (deg) made by a normal line of the first mirror 2 and an optical axis, α2 denotes an angle (deg) made by a normal line of the second mirror 3 and an optical axis, and α3 denotes an angle (deg) made by a normal line of an image surface 4 and the optical axis.

Formula (7)

Formula (8)

TABLE 1

| efy = 8.59  efx = 29.58  Wy = 20  Wx = 10  Fny = 4.30  Fnx = 14.79 |||
| --- | --- | --- |
| Diaphragm | Circular: Φ2.0 | |
| | | d1: 6.61 |
| M1 | α1: 30 | |
| (Curved-axis | rdy: −15.07698 | rdx: −161.387 |
| Y toric surfaces) | YAD: 1.4254 × 10⁻⁵ | |
| | YAOD: −7.5192 × 10⁻⁴ | YAOE: 1.6213 × 10⁻⁵ |
| | BC: 9.2330 × 10⁻³ | |
| | BOD: 3.4719 × 10⁻³ | |
| | | d2: 23.41 |
| M2 | α2: 30 | |
| (Curved-axis | rdy: −22.108 | rdx: −56.202 |
| Y toric surfaces) | YAD: −2.2097 × 10⁻⁵ | |
| | YAOD: 3.3323 × 10⁻⁴ | YAOE: 2.7018 × 10⁻⁷ |
| | BC: −1.7039 × 10⁻³ | |
| | BOD: 7.7878 × 10⁻⁵ | |
| | | d3: 22.16 |
| Image surface | α3: 0 | |

TABLE 2

| efy = 9.75  efx = 24.94  Wy = 10  Wx = 5  Fny = 3.25  Fnx = 8.31 |||
| --- | --- | --- |
| Diaphragm | Circular: Φ3.0 | |
| | | d1: 8.15 |
| M1 | α1: 30 | |

TABLE 2-continued

| efy = 9.75 efx = 24.94 Wy = 10 Wx = 5 Fny = 3.25 Fnx = 8.31 | | |
|---|---|---|
| Diaphragm | Circular: Φ3.0 | |
| (Curved-axis X toric surfaces) | rdy: −15.40531<br>YAD: −1.11104 × $10^{-6}$<br>YAF: 3.20283 × $10^{-7}$<br>YAOD: 1.28434 × $10^{-3}$<br>YAOF: −3.52620 × $10^{-7}$<br>XAD: 2.97163 × $10^{-5}$<br>BC: −4.08445 × $10^{-4}$<br>QC: 1.45193 × $10^{-4}$ | rdx: −78.23718<br>YAE: −7.94940 × $10^{-6}$<br>YAG: 5.58089 × $10^{-10}$<br>YAOE: 1.02160 × $10^{-5}$<br>YAOG: 1.28002 × $10^{-8}$<br>XAE: 2.42403 × $10^{-6}$<br>BD: −1.37960 × $10^{-4}$<br>QD: −2.89601 × $10^{-6}$<br>d2: 17.89 |
| M2 | α2: 30 | |
| (Curved-axis X toric surfaces) | rdy: 14.82636<br>YAD: 1.41004 × $10^{-5}$<br>YAF: −1.08431 × $10^{-8}$<br>YAOD: 2.08556 × $10^{-4}$<br>YAOF: 9.93788 × $10^{-8}$<br>XAD: −9.91702 × $10^{-7}$<br>BC: −8.01946 × $10^{-4}$<br>QC: 3.07422 × $10^{-4}$ | rdx: 58.27511<br>YAE: −8.10057 × $10^{-7}$<br>YAG: 3.22948 × $10^{-9}$<br>YAOE: −3.49859 × $10^{-6}$<br>YAOG: 3.43238 × $10^{-9}$<br>XAE: 1.65342 × $10^{-6}$<br>BD: 3.67792 × $10^{-5}$<br>QD: 1.64131 × $10^{-6}$<br>d3: 15.02 |
| Image surface | α3: 23.74 | |

Figure 3:
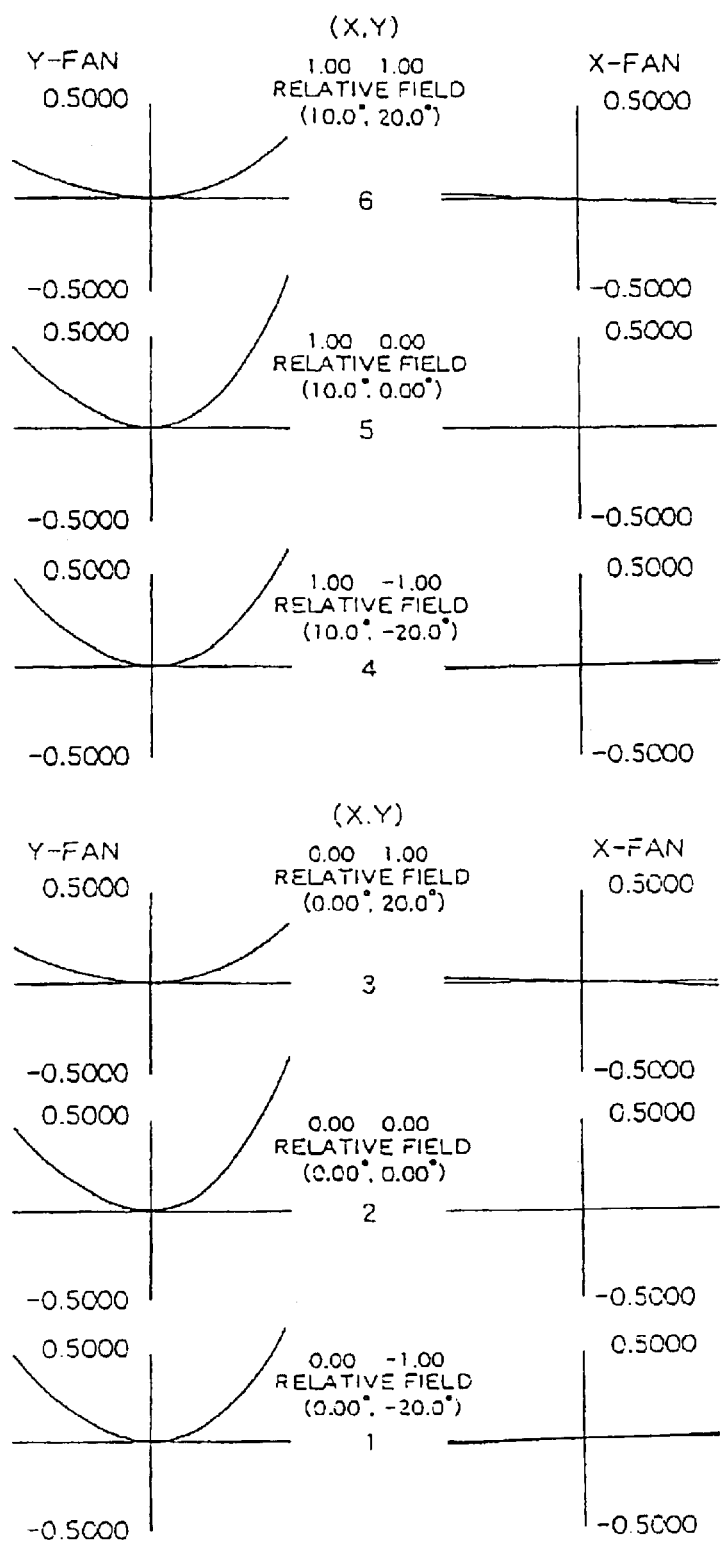
FIG. 3 is an aberration view showing an optical performance of a reflection optical device according to Example 1.
Figure 4:
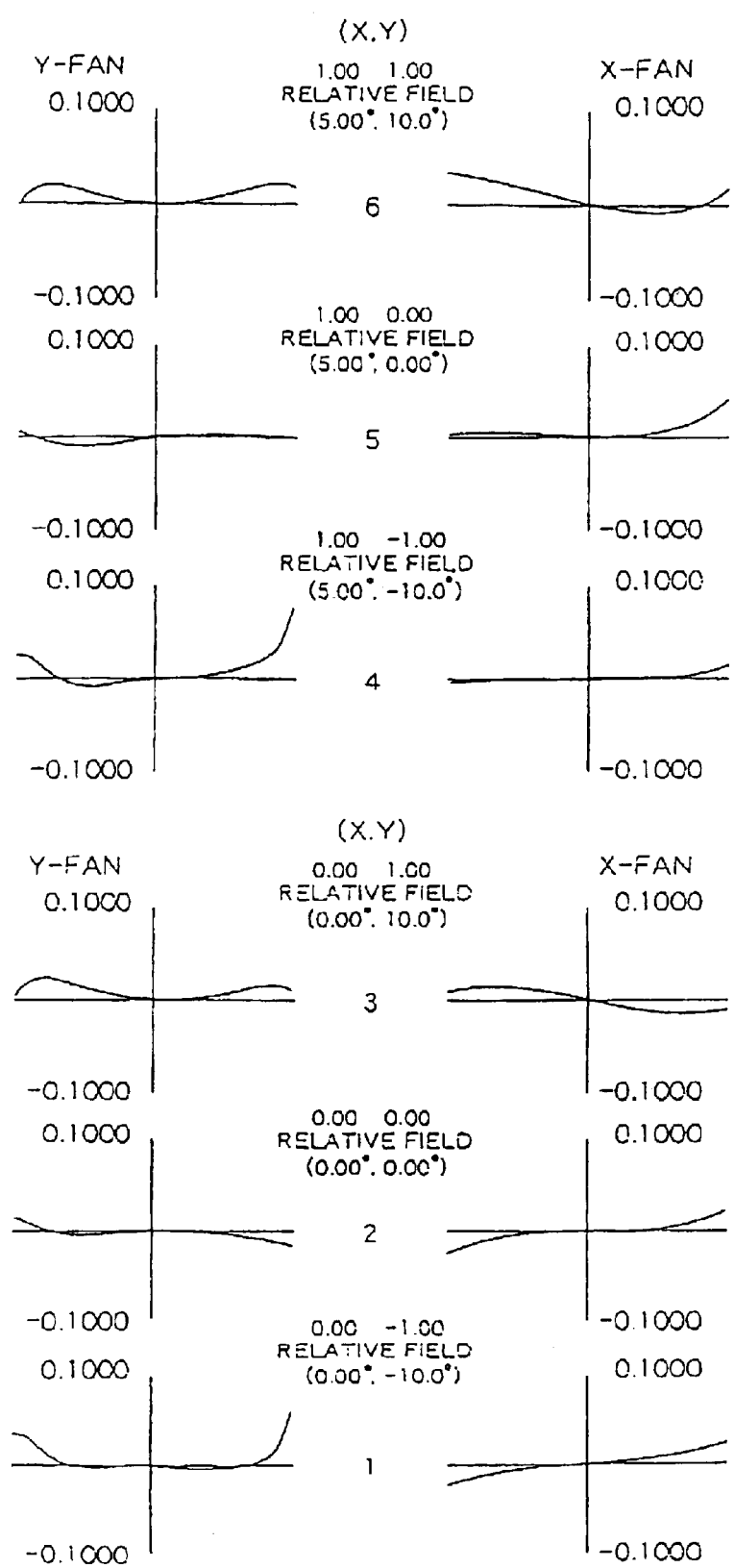
FIG. 4 is an aberration view showing an optical performance of a reflection optical device according to Example 2.

FIG. 3 is aberration views showing an optical performance of the reflection optical device according to Example 1 of Table 1, and FIG. 4 is aberration views showing an optical performance of the reflection optical device according to Example 2 of Table 2.

According to this embodiment, since two curved toric surface mirrors having a function of correcting aberration with high precision are disposed eccentrically, effective light fluxes can be guided to the image surface without being blocked and image can be formed on the image surface efficiently. Furthermore, since a light shielding plate 6 is disposed, unnecessary light fluxes do not reach the image surface directly. In addition, since no refractive transmission surfaces are provided, unnecessary light reflected by the transmission surface does not reach the image surface. Therefore, it is easy to prevent a ghost image from being generated.

Furthermore, Wy=20 is realized in Example 1 of Table 1, and Wy=10 is realized in the second Example 2 of Table 2, and Formula (11) is satisfied.

Note here that the embodiment shown in FIG. 1 explains an example in which the diaphragm 1 and the external light shielding plate 6, which are formed individually, are bonded. However, these may be formed into one piece. Thus, since the process for securing the external light shielding plate 6 onto the part of the diaphragm 1 can be omitted, it is possible to facilitate the manufacture and to reduce the cost.

Furthermore, in this embodiment, the shape of the mirror surface was defined by Formulae 1 through 5 or Formulae 6 through 10. However, the shape is not necessarily limited to this and it may be another shape defined by a different formula as long as the similar surface can be realized.

(Second Embodiment)

Figure 5:
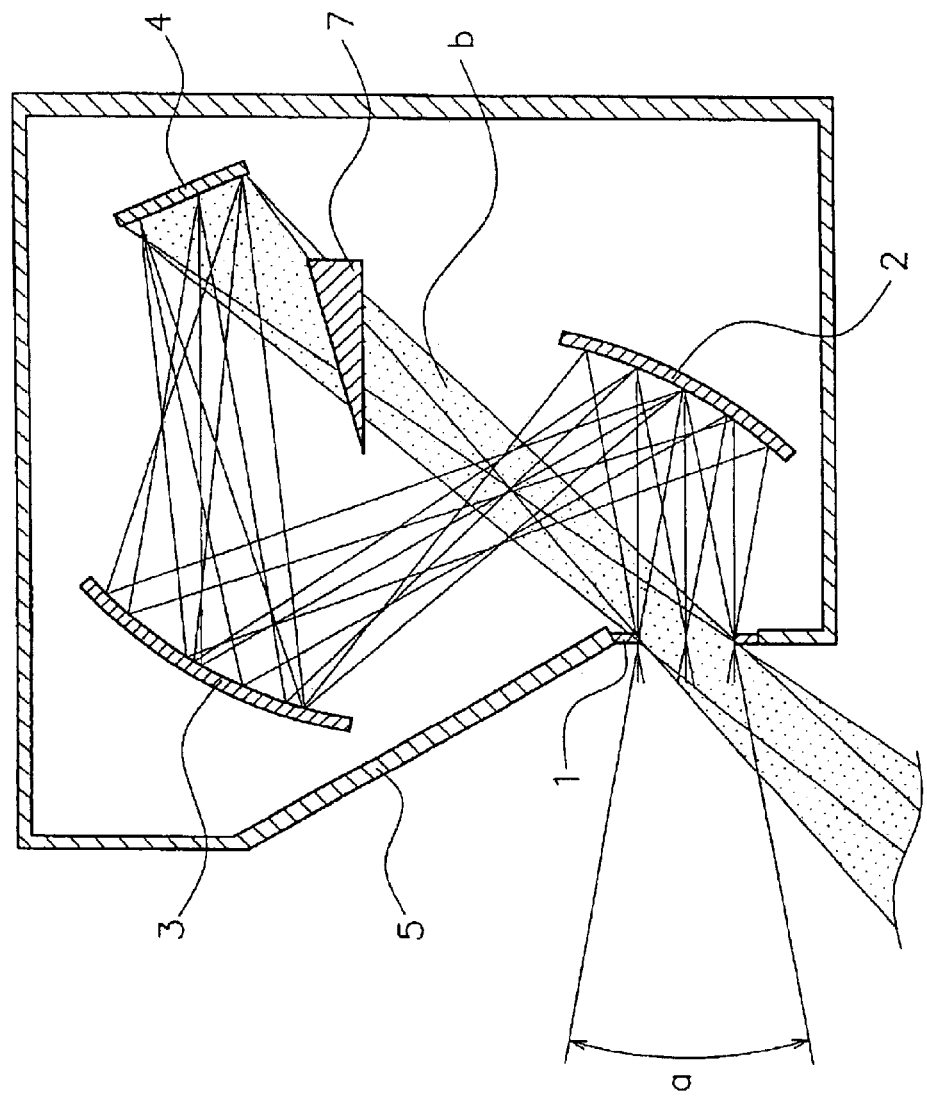
FIG. 5 is a view showing a configuration of a reflection optical device according to a second embodiment of the present invention.

FIG. 5 is a view showing a configuration of a reflection optical device according to the second embodiment of the present invention. The basic configuration of the embodiment shown in FIG. 5 is the same as that of the first embodiment shown in FIG. 1 excepting the arrangement of the light shielding plate 7 that is a means for blocking light. The same numbers are given to the portions having the same configurations.

In this embodiment, the light shielding plate 7 is disposed inside the housing 5. Specifically, the light shielding plate 7 is disposed in a space surrounded by an optical axis extending from the vertex of the first reflection surface 2 to the vertex of the second reflection surface 3, an optical axis extending from the vertex of the second reflection surface 3 to the center of the image surface 4, and a line connecting between the center of the image surface 4 and the vertex of the first reflection surface 2 in a plane including the center of the image surface 4 and the vertex of the reflection surface 2, 3.

That is, the light shielding plate 7 is disposed so that it blocks unnecessary light fluxes reaching the pickup range on the image surface 4 without being reflected by the reflection surfaces of the first mirror 2 and the second mirror 3. Thus, unnecessary light fluxes are blocked reliably before reaching the pickup range on the image surface 4. In this embodiment, since the light shielding plate 7 is disposed inside the housing 5, it is advantageous that the device can be made smaller in this embodiment as compared with the embodiment 1.

Note here that it is not necessary for the entire light shielding plate 7 to be disposed inside the above-mentioned space, but a part having a role of blocking light in the light shielding plate 7, that is, only a light shielding surface, may be disposed in the above-mentioned space. Furthermore, the outer shape of the light shielding plate 7 is adjusted so as not to block effective light fluxes that form an image on the image surface 4.

(Third Embodiment)

Figure 6:
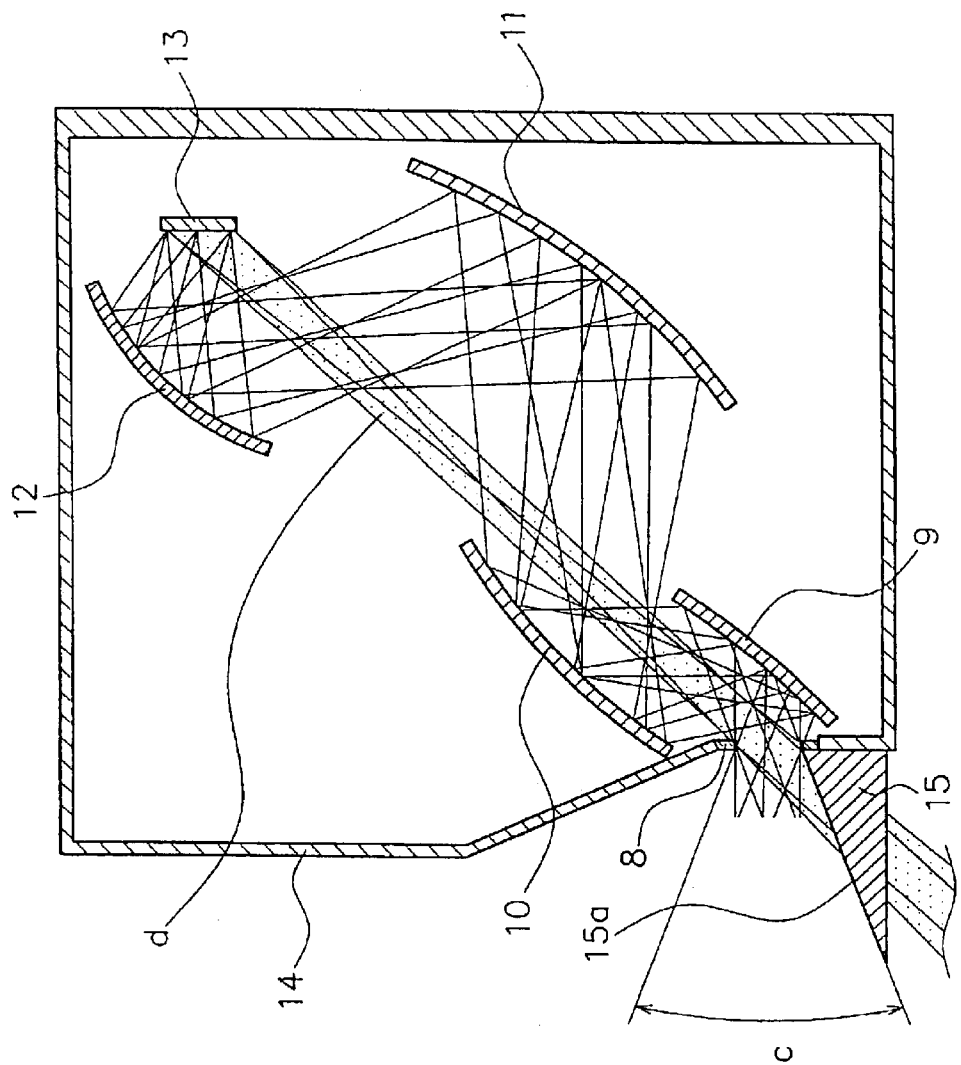
FIG. 6 is a view showing a configuration of a reflection optical device according to a third embodiment of the present invention.
Figure 7:
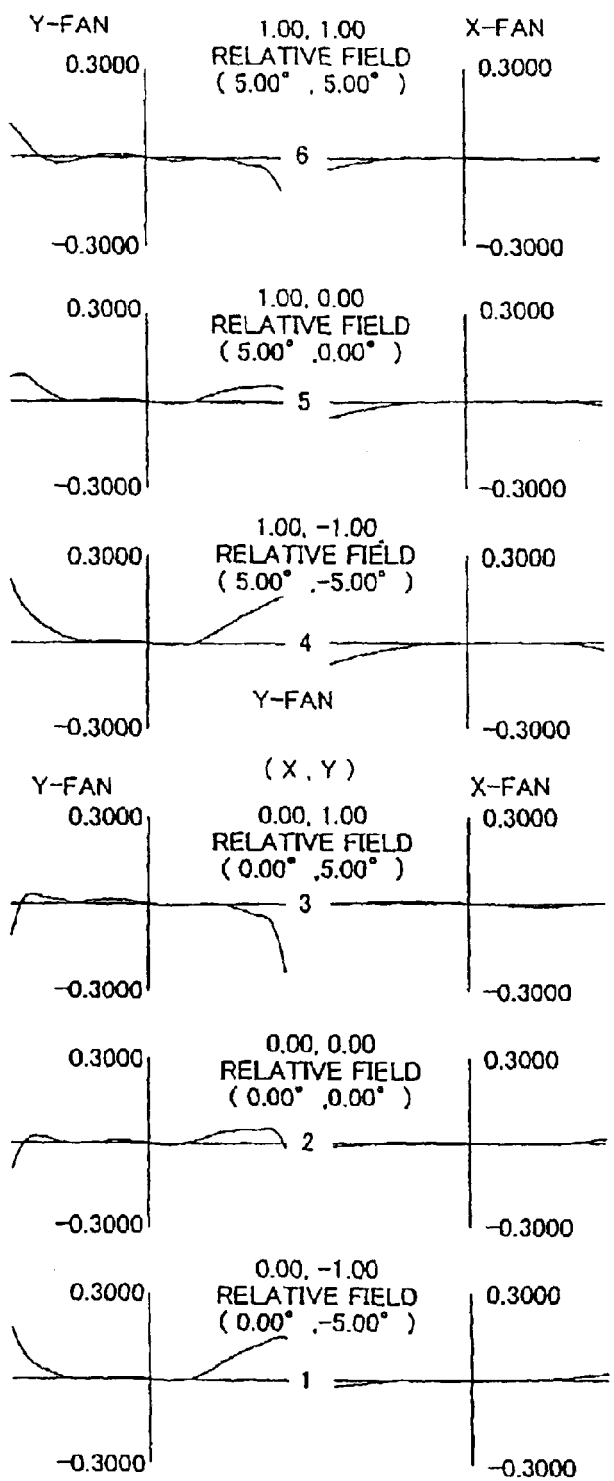
FIG. 7 is an aberration view showing an optical performance of a reflection optical device according to Example 3.
Figure 8:
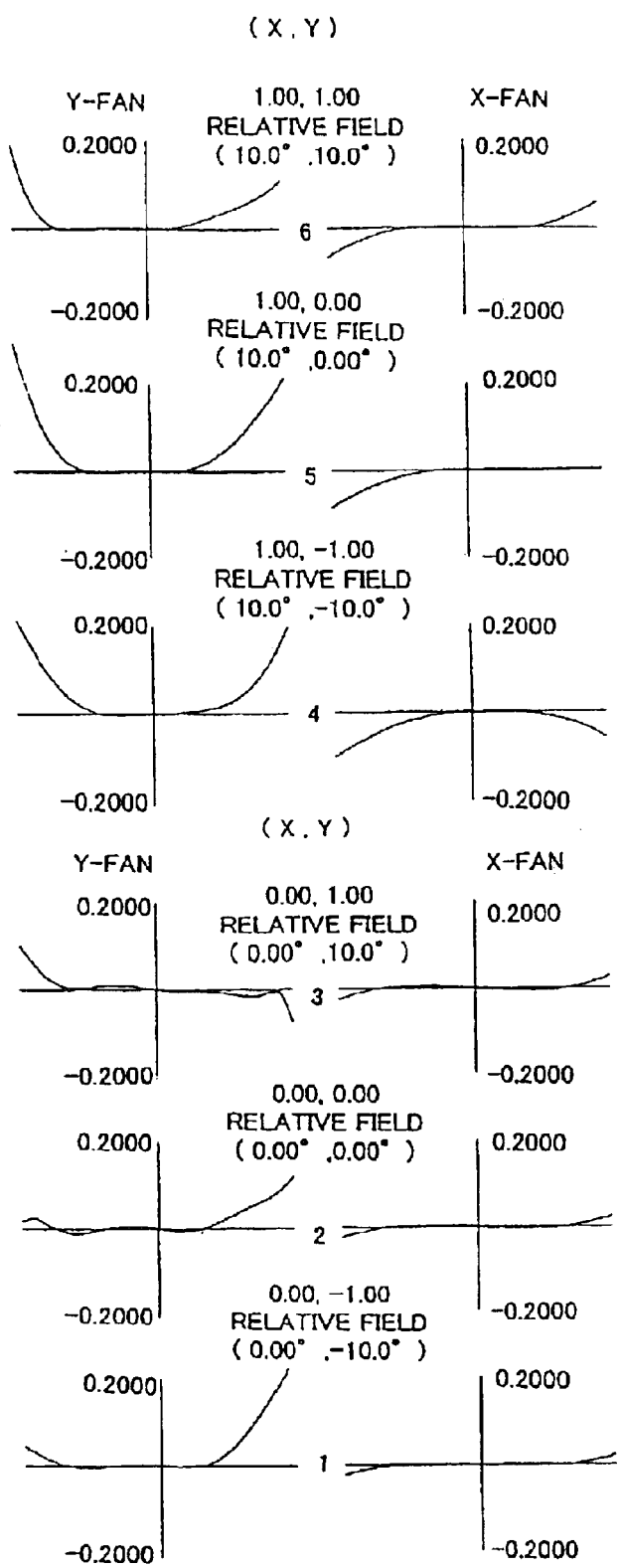
FIG. 8 is an aberration view showing an optical performance of a reflection optical device according to Example 4.
Figure 9:
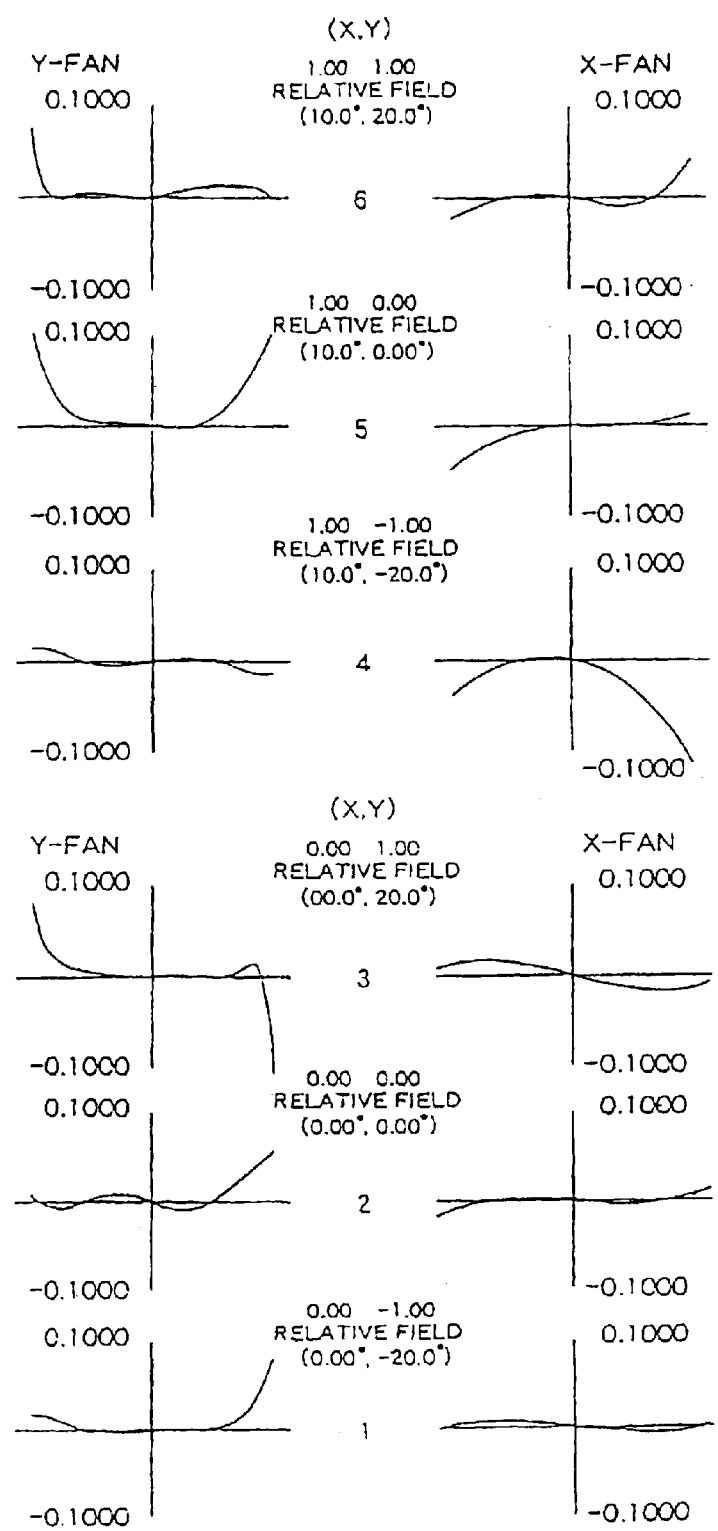
FIG. 9 is an aberration view showing an optical performance of a reflection optical device according to Example 5.
Figure 10:
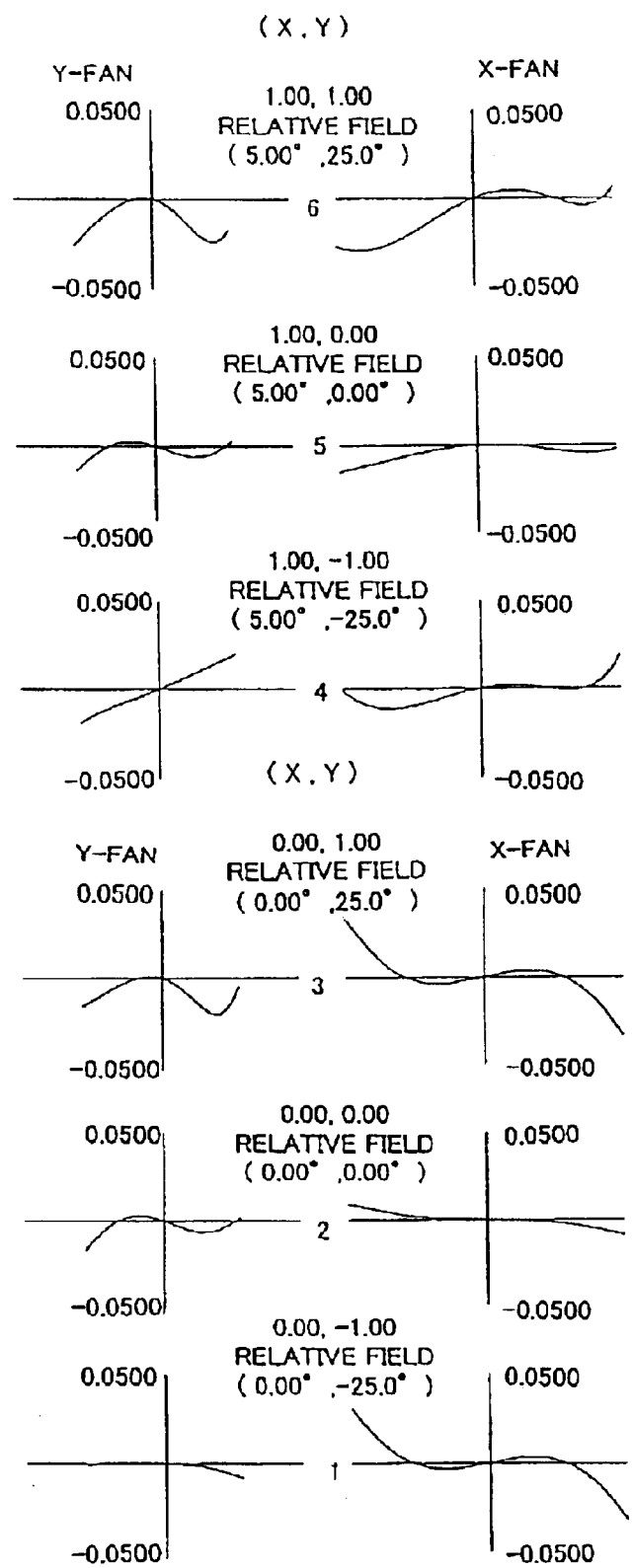
FIG. 10 is an aberration view showing an optical performance of a reflection optical device according to Example 6.

FIG. 6 is a view showing a configuration of a reflection optical device according to the third embodiment of the present invention. In FIG. 6, reference numeral 8 denotes a diaphragm, 9 denotes a first mirror, 10 denotes a second mirror, 11 denotes a third mirror, 12 denotes a fourth mirror, 13 denotes an image surface, 14 denotes a housing, and 15 denotes a light shielding plate. Light fluxes released from the object are limited at the diaphragm 8 and incident in the housing 14. These incident light fluxes are reflected by the first mirror 9, the second mirror 10, the third mirror 11 and the fourth mirror 12 and form an image on the image surface 13. The first, second and third mirrors 9 through 11 are disposed obliquely with respect to the optical axis, that is, disposed eccentrically so that the light fluxes are reflected obliquely.

In order to block the outside light from a place other than the image pickup range c, an optical system including the first mirror 9, the second mirror 10, the third mirror 11 and the forth mirror 12 and the image surface 13 are surrounded by the housing 14. In this embodiment, a light shielding plate 15 that is a means for blocking light is further provided. The light shielding plate 15 is disposed in front of the diaphragm 8 (at the side of the object with respect to the diaphragm 1) with one end located at the side of the diaphragm 8 and the other end extending to the side of the object. Furthermore, an inclined surface 15a is disposed so as not to block the light fluxes released from the object.

Herein, a region d shows an unnecessary light flux transmission region. In the case where the light shielding plate 15 is not provided, unnecessary light fluxes entering from the diaphragm 8 pass through the unnecessary light flux transmission region d and directly reach the image surface 13. In this embodiment, since the light shielding plate 15 is disposed in front of the diaphragm 8, the unnecessary light fluxes are shielded before entering the housing 14. Thus, the unnecessary light fluxes are prevented from entering the inside of the optical system reliably.

That is, the light shielding plate 15 is disposed so as to block the unnecessary light fluxes released from a place other than the object and reaching the image pickup region on the image surface 13 without being reflected by the first mirror 9, the second mirror 10, the third mirror 11 and the fourth mirror 12.

For the surface shape of the first mirror 9, the second mirror 10, the third mirror 11 and fourth mirror 12, a curved-axis Y-toric surface (see FIG. 2) or a curved-axis X-toric surface are used, which are defined by Formulae (1) through (5) or Formulae (6) through (10).

Furthermore, when an open F value in the plane including vertices of the four reflection surfaces is expressed by Fno., Fno. preferably satisfies the following relationship formula (12). It is because when the brightness is higher than the upper limit of Formula (12), for example, under the influence of the diffraction in the case where the far-infrared region with wavelength of 10 μm is picked up, it becomes difficult to achieve MTF of 20% or more at 20 (l.p/mm), and when the brightness is lower than the lower limit, it is difficult to correct the aberration.

$$0.95 \leq Fno. \leq 3.1 \quad \text{Formula (12)}$$

Furthermore, it is preferable that the following formulae (13) and (14) are satisfied. Thus, it is possible to provide a reflection optical device that is extremely bright although the angle of view is narrow, and the effect of shielding unnecessary light by the light shielding plate 15 is added, thereby realizing excellent telescopic image pickup. In Formula (14), if the value is larger than the upper limit, when the pickup in the far-infrared region is carried out, it is difficult to improve the resolution due to the effect of diffraction, and when the value is lower than the lower limit, it is difficult to correct the aberration.

$$3 \leq Wy < 10 \quad \text{Formula (13)}$$

$$0.95 \leq Fno. \leq 3.1 \quad \text{Formula (14)}$$

Furthermore, the device may satisfy the following Formulae (15) and (16). Thus, it is possible to provide a reflection optical device that is bright although the angle of view is narrow, and the effect of shielding unnecessary light by the light shielding plate 15 is added, thereby realizing excellent image pickup that is rather telescopic and has general versatility. In Formula (16), when the value is higher than the upper limit, it becomes difficult to improve the resolution due to the influence of the diffraction in the case where the pickup in the far infrared region is carried out, and when the value is lower than the lower limit, it is difficult to correct aberration.

$$10 \leq Wy < 20 \quad \text{Formula (15)}$$

$$1.1 \leq Fno. \leq 3.1 \quad \text{Formula (16)}$$

Furthermore, the device may satisfy the following Formulae (17) and (18). Thus, it is possible to provide a reflection optical device that is bright although the angle of view is narrow, and the effect of blocking unnecessary light by the light shielding plate 15 is added, thereby realizing an excellent image pickup that is rather wide-angle and has general versatility. In Formula (18), when the value is higher than the upper limit, it becomes difficult to improve the resolution due to the influence of the diffraction in the case where the pickup in the far infrared region is carried out, and when the value is lower than the lower limit, it is difficult to correct aberration.

$$20 \leq Wy < 30 \quad \text{Formula (17)}$$

$$1.4 \leq Fno. \leq 3.1 \quad \text{Formula (18)}$$

Furthermore, with respect to the above-mentioned formulae (12), (14), (16) or (18) showing the relationship of Fno., preferably, the following formula (19) is satisfied, and more preferably, the following formula (20) is satisfied.

$$Fno. \leq 1.9 \quad \text{Formula (19)}$$

$$Fno. \leq 1.6 \quad \text{Formula (20)}$$

When Formula (19) is satisfied, even under the influence of the diffraction in the case where pickup in the far-infrared region with a wavelength of, for example, 10 μm is carried out, it is possible to achieve MTF of 20% or more at 35 (l.p/mm), and when Formula (20) is satisfied, it is possible to achieve MTF of 20% or more at 40 (l.p/mm).

Next, Tables 3 through 6 show the specific numerical examples of this embodiment. In each table, M1 denotes the first mirror 9, M2 denotes the second mirror 10, M3 denotes the third mirror 11 and M4 denotes the fourth mirror 12. In each Example of each table, M1 and M4 are the curved-axis X toric surfaces and M2 and M3 are the curved-axis Y toric surfaces. The shape of the diaphragm is a circle in Examples 3 through 5 shown in Tables 3 through 5, and is an oval (diameter in the Y direction=ely and diameter in the X direction elx) in Example 6 shown in Table 6.

Furthermore, Wy denotes a half angle of view (deg) in the Y direction in a plane including vertices of the reflection surface; Wx denotes a half angle of view (deg) in the Y direction in a plane including vertices on the reflection surface; efy denotes a focal length (mm) of the entire system in the Y direction; efx denotes a focal length (mm) of the entire system in the X direction; Fny denotes an F value in the Y direction; Fnx denotes an F value in the X direction; d1 denotes a distance (mm) from the center of the diaphragm 8 to the vertex of the first mirror 9; d2 denotes a distance (mm) from the vertex of the first mirror 9 to the vertex of the second mirror 10; d3 denotes a distance (mm) from the vertex of the second mirror 10 to the reflex of the third mirror 11; d4 denotes a distance (mm) from the vertex of the third mirror 11 to the vertex of the fourth mirror 12; and d5 denotes a distance (mm) from the vertex of the fourth mirror 12 to the center of the image surface 13.

Furthermore, α1 denotes an angle (deg) made by a normal line of the first mirror 9 and an optical axis; β2 denotes an angle (deg) made by a normal line of the second mirror 10 and an optical axis; α3 denotes an angle (deg) made by a normal line of the third mirror 11 and an optical axis; α4 denotes an angle (deg) made by a normal line of the fourth mirror 12 and an optical axis; and α5 denotes an angle (deg) made by a normal line of the image surface 13 and an optical axis.

TABLE 3 efy = 4.95 efx = 8.2 Wy = 5 Wx = 5 Fny = 0.95 Fnx = 1.58

| | | | |
|---|---|---|---|
| Diaphragm | | Circular: Φ5.2 | |
| | | | d1: 3.70 |
| M1 (Curved-axis X toric surfaces) | rdy: −28.27521<br>YAD: $1.02556 \times 10^{-4}$<br>YAOD: $5.06972 \times 10^{-4}$<br>XAD: $-1.0962 \times 10^{-4}$<br>BC: $1.29266 \times 10^{-2}$<br>QC: $-5.70442 \times 10^{-4}$ | α1: 45<br>rdx: −105.98079<br>YAE: $2.83097 \times 10^{-6}$<br>YAOE: $-3.75050 \times 10^{-5}$<br>XAE: $3.2316 \times 10^{-6}$<br>BD: $6.31068 \times 10^{-4}$<br>QD: $2.94019 \times 10^{-5}$ | <br><br><br><br><br>BE: $-1.12113 \times 10^{-4}$<br>QE: $-1.83285 \times 10^{-6}$ |
| | | | d2: 9.6 |
| M2 (Curved-axis Y toric surfaces) | rdy: 41.39209<br>YAD: $-7.16742 \times 10^{-5}$<br>YAOD: $-1.52126 \times 10^{-4}$<br>BC: $7.78348 \times 10^{-3}$<br>BOC: $-7.32163 \times 10^{-2}$ | α2: 45<br>rdx: −27.71945<br>YAE: $-3.45971 \times 10^{-8}$<br>YAOE: $-2.22863 \times 10^{-6}$<br>BD: $6.35020 \times 10^{-4}$<br>BOD: $-2.44275 \times 10^{-3}$ | <br><br><br><br>BE: $1.39808 \times 10^{-4}$<br>BOE: $-3.23971 \times 10^{-4}$ |
| | | | d3: 22.17 |
| M3 (Curved-axis Y toric surfaces) | rdy: −43.65138<br>YAD: $1.17856 \times 10^{-6}$<br>YAOD: $5.53600 \times 10^{-5}$<br>BC: $-1.00083 \times 10^{-3}$<br>BOC: $-5.54207 \times 10^{-3}$ | α3: 37.5<br>rdx: −17.39224<br>YAE: $4.88859 \times 10^{-8}$<br>YAOE: $4.28108 \times 10^{-7}$<br>BO: $-4.03599 \times 10^{-7}$<br>BOD: $2.48896 \times 10^{-5}$ | <br><br><br><br>BE: $-9.68610 \times 10^{-9}$<br>BOE: $-3.60009 \times 10^{-7}$ |
| | | | d4: 22.57 |
| M4 (Curved-axis X toric surfaces) | rdy: 20.69789<br>YAD: $1.26072 \times 10^{-4}$<br>YAF: $1.51652 \times 10^{-7}$<br>YAOD: $2.61273 \times 10^{-4}$<br>YAOF: $-3.79231 \times 10^{-7}$<br>XAD: $-7.44221 \times 10^{-5}$<br>BC: $-1.84455 \times 10^{-2}$<br>QC: $-7.05260 \times 10^{-4}$ | α4: 30<br>rdx: 7.04215<br>YAE: $-4.27173 \times 10^{-6}$<br>YAG: $-9.76524 \times 10^{-10}$<br>YAOE: $2.13618 \times 10^{-5}$<br>YAOG: $1.03312 \times 10^{-8}$<br>XAE: $-5.76785 \times 10^{-7}$<br>BD: $-1.68089 \times 10^{-5}$<br>QD: $-7.44136 \times 10^{-6}$ | <br><br><br><br><br><br><br>BE: $1.09803 \times 10^{-5}$<br>QE: $6.10570 \times 10^{-7}$ |
| | | | d5: 7.7 |
| Image surface | | α5: 16 | |

TABLE 4 efy = 4.95 efx = 8.2 Wy = 10 Wx = 10 Fny = 1.10 Fnx = 1.82

| | | | |
|---|---|---|---|
| Diaphragm | | Circular: Φ4.5 | |
| | | | d1: 3.70 |
| M1 (Curved-axis X toric surfaces) | rdy: −28.27225<br>YAD: $1.08844 \times 10^{-4}$<br>YAOD: $5.65907 \times 10^{-4}$<br>XAD: $-1.31496 \times 10^{-4}$<br>BC: $1.01233 \times 10^{-2}$<br>QC: $-4.25193 \times 10^{-4}$ | α1: 45<br>rdx: −105.69323<br>YAE: $3.06546 \times 10^{-6}$<br>YAOE: $-4.12477 \times 10^{-5}$<br>XAE: $7.43903 \times 10^{-7}$<br>BD: $6.01015 \times 10^{-4}$<br>QD: $4.34592 \times 10^{-5}$ | <br><br><br><br><br>BE: $-7.92244 \times 10^{-5}$<br>QE: $-1.01385 \times 10^{-6}$ |
| | | | d2: 9.6 |
| M2 (Curved-axis Y toric surfaces) | rdy: 39.64773<br>YAD: $-5.60488 \times 10^{-6}$<br>YAOD: $-6.70024 \times 10^{-5}$<br>BC: $7.48019 \times 10^{-3}$<br>BOC: $-7.03043 \times 10^{-2}$ | α2: 45<br>rdx: −27.72966<br>YAE: $-2.34213 \times 10^{-7}$<br>YAOE: $-1.27702 \times 10^{-6}$<br>BD: $2.72224 \times 10^{-4}$<br>BOD: $-1.70279 \times 10^{-3}$ | <br><br><br><br>BE: $6.59806 \times 10^{-7}$<br>BOE: $-1.65868 \times 10^{-5}$ |
| | | | d3: 22.19 |
| M3 (Curved-axis Y toric surfaces) | rdy: −43.64144<br>YAD: $8.44053 \times 10^{-7}$<br>YAOD: $5.00413 \times 10^{-5}$<br>BC: $-9.95660 \times 10^{-4}$<br>BOC: $-5.62691 \times 10^{-3}$ | α3: 37.5<br>rdx: −17.39145<br>YAE: $5.20757 \times 10^{-8}$<br>YAOE: $6.68626 \times 10^{-7}$<br>BD: $-8.00549 \times 10^{-7}$<br>BOD: $4.06888 \times 10^{-5}$ | <br><br><br><br>BE: $-6.10841 \times 10^{-9}$<br>BOE: $-1.35045 \times 10^{-9}$ |
| | | | d4: 22.57 |
| M4 (Curved-axis X toric surfaces) | rdy: 20.69433<br>YAD: $1.29951 \times 10^{-4}$<br>YAF: $1.51679 \times 10^{-7}$<br>YAOD: $2.77413 \times 10^{-4}$<br>YAOF: $-3.87449 \times 10^{-7}$<br>XAD: $-7.92485 \times 10^{-5}$<br>BC: $-1.94353 \times 10^{-2}$ | α4: 30<br>rdx: 7.04381<br>YAE: $-4.20345 \times 10^{-6}$<br>YAG: $-1.02477 \times 10^{-9}$<br>YAOE: $2.06307 \times 10^{-5}$<br>YAOG: $1.03479 \times 10^{-8}$<br>XAE: $-1.56111 \times 10^{-6}$<br>BD: $-8.36210 \times 10^{-5}$ | <br><br><br><br><br><br>BE: $7.90330 \times 10^{-6}$ |

TABLE 4-continued efy = 4.95 efx = 8.2 Wy = 10 Wx = 10 Fny = 1.10 Fnx = 1.82

| | | | |
|---|---|---|---|
| Diaphragm | | Circular: Φ4.5 | |
| | QC: −6.60836 × 10⁻⁴ | QD: −6.90683 × 10⁻⁶ | QE: 3.15739 × 10⁻⁷ |
| | | | d5: 7.7 |
| Image surface | | α5: 16 | |

TABLE 5 efy = 4.95 efx = 8.2 Wy = 20 Wx = 10 Fny = 1.41 Fnx = 2.34

| | | | |
|---|---|---|---|
| Diaphragm | | Circular: Φ3.5 | |
| | | | d1: 3.70 |
| M1 | | α1: 45 | |
| (Curved-axis | rdy: −28.36101 | rdx: −106.68403 | |
| X toric surfaces) | YAD: 1.10697 × 10⁻⁴ | YAE: 2.99391 × 10⁻⁶ | |
| | YAOD: 5.79682 × 10⁻⁴ | YAOE: −4.14654 × 10⁻⁵ | |
| | XAD: −1.29369 × 10⁻⁴ | XAE: 3.35450 × 10⁻⁷ | |
| | BC: 1.11679 × 10⁻² | BD: 6.83405 × 10⁻⁴ | BE: −7.47472 × 10⁻⁵ |
| | QC: −3.87840 × 10⁻⁴ | QD: 3.81498 × 10⁻⁵ | QE: −2.08261 × 10⁻⁶ |
| | | | d2: 9.6 |
| M2 | | α2: 45 | |
| (Curved-axis | rdy: 39.31311 | rdx: −27.92454 | |
| Y toric surfaces) | YAD: −2.16018 × 10⁻⁷ | YAE: −2.99374 × 10⁻⁸ | |
| | YAOD: −5.60292 × 10⁻⁵ | YAOE: −7.09183 × 10⁻⁷ | |
| | BC: 7.55866 × 10⁻³ | BD: 2.71136 × 10⁻⁴ | BE: 2.69578 × 10⁻⁷ |
| | BOC: −7.07328 × 10⁻² | BOD: −1.68621 × 10⁻³ | BOE: −1.72513 × 10⁻⁵ |
| | | | d3: 22.15 |
| M3 | | α3: 37.5 | |
| (Curved-axis | rdy: −43.63003 | rdx: −17.35842 | |
| Y toric surfaces) | YAD: 7.18754 × 10⁻⁷ | YAE: 5.41462 × 10⁻⁸ | |
| | YAOD: 4.82396 × 10⁻⁵ | YAOE: 6.70946 × 10⁻⁷ | |
| | BC: −9.91360 × 10⁻⁴ | BD: −7.75342 × 10⁻⁷ | BE: −7.57007 × 10⁻⁹ |
| | BOC: −5.65695 × 10⁻³ | BOD: 4.13483 × 10⁻⁵ | BOE: 1.39452 × 10⁻⁸ |
| | | | d4: 22.5 |
| M4 | | α4: 30 | |
| (Curved-axis | rdy: 20.71904 | rdx: 7.03109 | |
| X toric surfaces) | YAD: 1.30093 × 10⁻⁴ | YAE: −4.17720 × 10⁻⁶ | |
| | YAF: 1.52547 × 10⁻⁷ | YAG: −1.00136 × 10⁻⁹ | |
| | YAOD: 2.74354 × 10⁻⁴ | YAOE: 2.05378 × 10⁻⁵ | |
| | YAOF: −3.86108 × 10⁻⁷ | YAOG: 1.04814 × 10⁻⁸ | |
| | XAD: −7.90990 × 10⁻⁵ | XAE: −1.59051 × 10⁻⁶ | |
| | BC: −1.94677 × 10⁻² | BD: −8.78028 × 10⁻⁵ | BE: 7.74365 × 10⁻⁶ |
| | QC: −6.58999 × 10⁻⁴ | QD: −7.68549 × 10⁻⁶ | QE: 2.82293 × 10⁻⁷ |
| | | | d5: 7.7 |
| Image surface | | α5: 16 | |

TABLE 6 efy = 4.95 efx = 8.2 Wy = 25 Wx = 5 Fny = 2.91 Fnx = 2.73

| | | | |
|---|---|---|---|
| Diaphragm | | Oval: ely = 1.75 elx = 3.0 | |
| | | | d1: 3.70 |
| M1 | | α1: 45 | |
| (Curved-axis | rdy: −27.84486 | rdx: −96.60869 | |
| X toric surfaces) | YAD: 1.03513 × 10⁻⁴ | YAE: 3.01919 × 10⁻⁶ | |
| | YAOD: 7.51834 × 10⁻⁴ | YAOE: −3.99463 × 10⁻⁵ | |
| | XAD: 1.82513 × 10⁻⁵ | XAE: −5.81005 × 10⁻⁶ | |
| | BC: 2.73116 × 10⁻³ | BD: 3.53144 × 10⁻³ | BE: 8.60275 × 10⁻⁵ |
| | QC: −6.41736 × 10⁻⁴ | QD: 1.31645 × 10⁻⁴ | QE: 1.20688 × 10⁻⁶ |
| | | | d2: 9.6 |
| M2 | | α2: 45 | |
| (Curved-axis | rdy: 37.58249 | rdx: −27.59662 | |
| Y toric surfaces) | YAD: −1.04090 × 10⁻⁶ | YAE: −1.15960 × 10⁻⁷ | |
| | YAOD: −5.89613 × 10⁻⁵ | YAOE: 1.70106 × 10⁻⁷ | |
| | BC: 7.59351 × 10⁻³ | BD: 2.69631 × 10⁻⁴ | BE: 3.41035 × 10⁻⁷ |
| | BOC: −6.78696 × 10⁻² | BOD: −1.69850 × 10⁻³ | BOE: −1.65408 × 10⁻⁵ |
| | | | d3: 21.99 |
| M3 | | α3: 37.5 | |
| (Curved-axis | rdy: −43.41434 | rdx: −17.43582 | |
| Y toric surfaces) | YAD: 7.25332 × 10⁻⁷ | YAE: 4.58233 × 10⁻⁸ | |

TABLE 6-continued efy = 4.95 efx = 8.2 Wy = 25 Wx = 5 Fny = 2.91 Fnx = 2.73

| Diaphragm | | Oval: ely = 1.75 elx = 3.0 | |
|---|---|---|---|
| | YAOD: $3.15841 \times 10^{-5}$ | YAOE: $7.17088 \times 10^{-7}$ | |
| | BC: $-9.77416 \times 10^{-4}$ | BD: $-1.30884 \times 10^{-6}$ | BE: $-4.46350 \times 10^{-8}$ |
| | BOC: $-5.51823 \times 10^{-3}$ | BOD: $3.97945 \times 10^{-5}$ | BOE: $9.75707 \times 10^{-8}$ |
| | | | d4: 22.54 |
| M4 | | α4: 30 | |
| (Curved-axis | rdy: 20.65812 | rdx: 7.02149 | |
| X toric surfaces) | YAD: $1.19275 \times 10^{-4}$ | YAE: $-4.27123 \times 10^{-6}$ | |
| | YAF: $1.63843 \times 10^{-7}$ | YAG: $-3.47605 \times 10^{-10}$ | |
| | YAOD: $2.30792 \times 10^{-4}$ | YAOE: $1.96160 \times 10^{-5}$ | |
| | YAOF: $-3.53296 \times 10^{-7}$ | YAOG: $1.29639 \times 10^{-8}$ | |
| | XAD: $-9.00698 \times 10^{-5}$ | XAE: $-1.06708 \times 10^{-6}$ | |
| | BC: $-2.05610 \times 10^{-2}$ | BD: $-1.83324 \times 10^{-4}$ | BE: $-9.97323 \times 10^{-6}$ |
| | QC: $-7.81636 \times 10^{-4}$ | QD: $-1.09010 \times 10^{-5}$ | QE: $-1.17753 \times 10^{-6}$ |
| | | | d5: 7.7 |
| Image surface | | α5: 16 | |

FIGS. 7 through 10 are aberration views showing an optical performance of the reflection optical device according to Examples 3 through 6 shown in Tables 3 through 6. Example 3 (Table 3) and Example 4 (Table 4) show a telescopic image pickup system. As is apparent from each Table, an extremely bright F value is achieved. Example 5 shown in Table 5 (Table 5) satisfies an angle of view having general versatility and brightness. As is apparent from FIG. 10, in Example 6 (Table 6), a wide angle of view is realized. Furthermore, in Example 6, as shown in Table 6, the shape of the diaphragm is assumed to be an oval elongated in the X direction and the F value in the X direction is made to be bright. Therefore, even under the influence of the diffraction, practical resolution can be obtained.

According to this embodiment, four mirrors having curved-axis X toric surface shape or curved-axis Y toric surface having a function of correcting aberration with high precision are arranged eccentrically, it is possible to guide effective fluxes to the image surface without being blocked and an optical image can be formed excellently.

Furthermore, since the light shielding plate 15 is disposed, unnecessary light fluxes cannot reach the image surface. In addition, since a refractive transmission surface is not provided, unnecessary light reflected by the transmission surface also does not reach the image surface. Therefore, it is easy to prevent a ghost image from being generated.

Furthermore, in Example 3 shown in Table 3, the reflection optical device satisfying Wy=5, Fny=0.95 and Fnx=1.58 and the above-mentioned formulae (13), (14) and (20) is realized. In Example 4 shown in Table 4, the reflection optical device satisfying Wy=10, Fny=1.10 and Fnx=1.82 and the above-mentioned formulae (15), (16) and (19) is realized. In Example 5 shown in Table 5, the reflection optical device satisfying Wy=20, Fny=1.41 and Fnx=2.34 and the above-mentioned formulae (17) and (18) is realized. In Example 6 shown in Table 6, the reflection optical device satisfying Wy=25, Fny=2.91 and Fnx=2.73 and the above-mentioned formulae (17) and (18) is realized. Furthermore, any of the Examples shown in Tables 3 through 6 satisfy the above-mentioned formula (11), Furthermore, the shape of the mirror is not necessarily limited to those expressed by Formulae (1) through (5) or Formulae (6) through (10), and may have any shapes expressed by different definition formulae as long as the same shape is realized.

(Fourth Embodiment)

Figure 11:
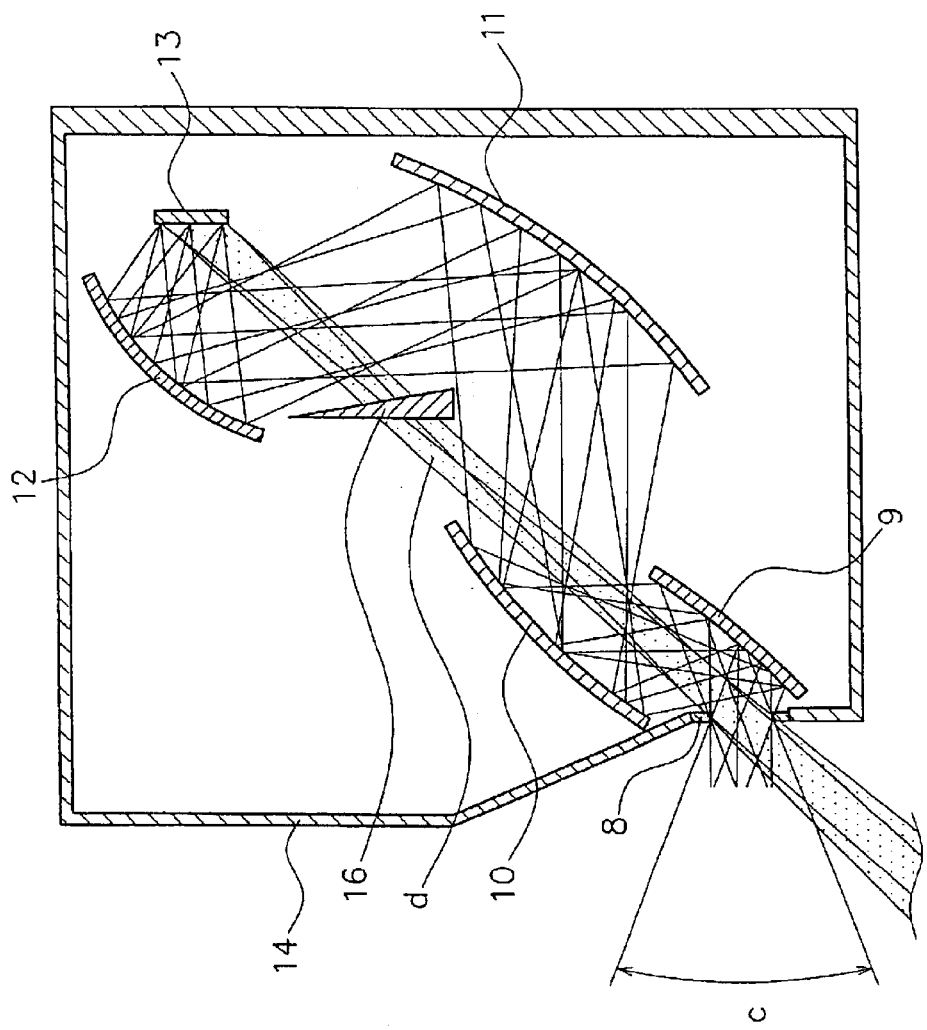
FIG. 11 is a view showing a configuration of a reflection optical device according to a fourth embodiment of the present invention.

FIG. 11 is a view showing a configuration of the reflection optical device according to the fourth embodiment of the present invention. The basic configuration of the embodiment shown in FIG. 11 is the same as that of the first embodiment shown in FIG. 6 excepting the arrangement of the light shielding plate 16 that is a means for blocking light. The same numbers are given to the portions having the same configurations.

In this embodiment, the light shielding plate 16 is disposed inside the housing 14. The light shielding plate 16 is disposed in a space surrounded by an optical axis extending from the vertex of the reflection surface of the second mirror 10 to the vertex of the reflection surface of the third mirror 11, an optical axis extending from the vertex of the reflection surface of the third mirror 11 to the vertex of the reflection surface of the fourth mirror 12; and the line connecting the vertex of the reflection surface of the second mirror 10 and the vertex of the reflection surface of the fourth mirror 12 so that the unnecessary light does not reach the image surface 13.

That is, the light shielding plate 16 is disposed so as to block unnecessary light fluxes released from a place other than the object and reaching the image pickup range on the image surface 13 without being reflected by the reflection surfaces of the mirrors 9 through 12. Thus, the unnecessary light flux can be blocked reliably before reaching the image pickup range on the image surface 13. In this embodiment, since the light shielding plate 16 is disposed in the housing 14, it is advantageous that the device can be made smaller as compared with the embodiment 4.

Furthermore, explanations for the above-mentioned formulae (11) through (20) similarly can be applied to this embodiment.

(Fifth Embodiment)

Figure 12:
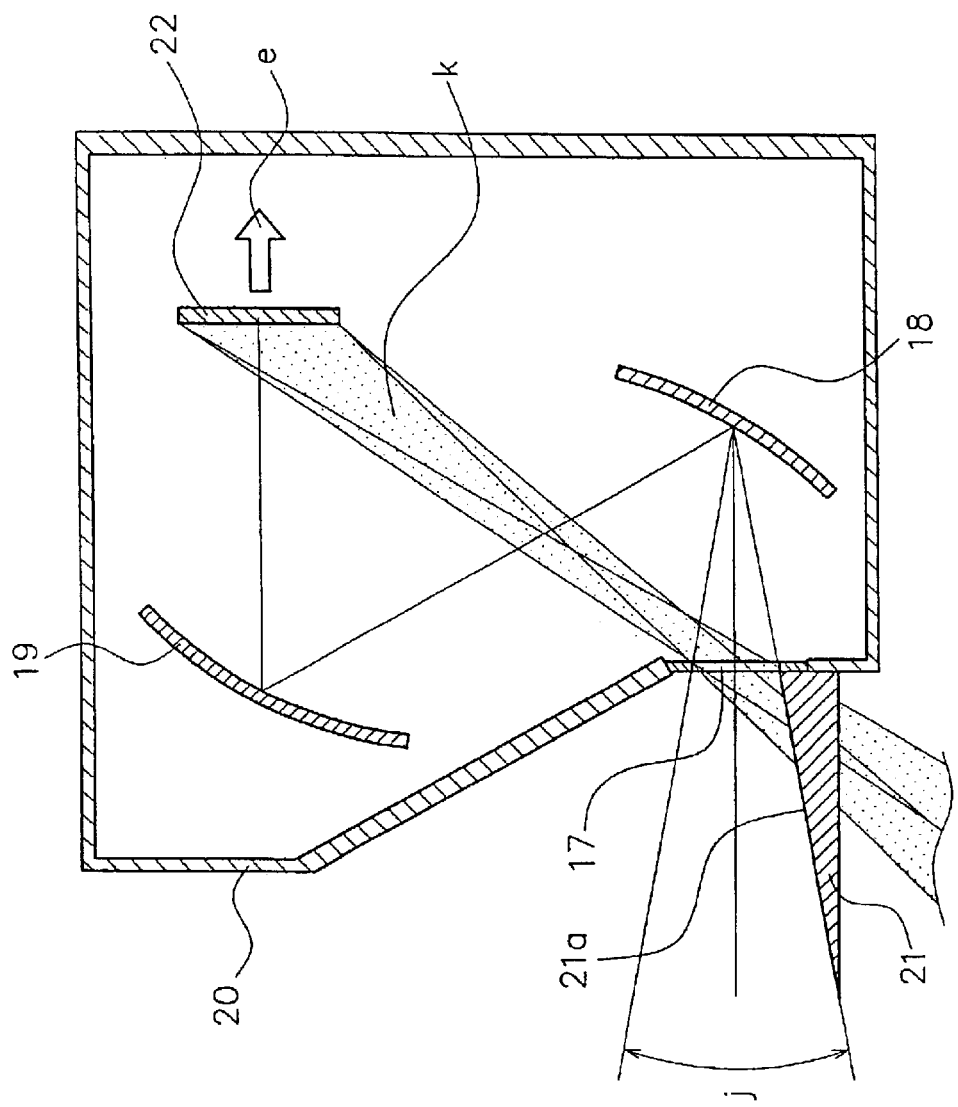
FIG. 12 is a view showing a configuration of a pickup device according to a fifth embodiment of the present invention.

FIG. 12 is a view showing a configuration of the reflection optical device according to the fifth embodiment of the present invention. The pickup device shown in FIG. 12 includes an opening window 17, a first mirror 18, a second mirror 19, a housing 20, a light shielding plate 21 and a two-dimensional image pickup element 22 that is an optical detector for converting light intensity into an electrical signal. The arrangement of the first mirror 18 and the second mirror 19, and the plane shapes thereof are the same as those in the first embodiment. The opening window 17 has a function as an aperture stop that transmits the wavelength band necessary to image pickup and at the same time limits the diameter of the light flux and also has a function for preventing dust particles from entering the optical system.

The light fluxes released from the object are limited at the opening window 17 disposed at the location of the diaphragm, and the image is formed on the two-dimensionally image pickup element 22 by way of the first mirror 18 and the second mirror 19. Also in this embodiment, since a light shielding plate 21 that is a means for blocking light is provided, unnecessary light fluxes are blocked and an excellent image can be obtained. In this embodiment, a picture image that is converted into the electrical signal at the two-dimensionally image pickup 22 is output (an arrow (e)).

According to this embodiment, the reflection optical system that is the same as that in the first embodiment 1 and a detector for converting light intensity into an electrical signal are provided and further the two dimensional image pickup element is used as the detector. Therefore, it is possible to obtain a picture signal having a wide angle of view and high resolution. Furthermore, if a two-dimensional image pick element having sensitivity to light beams in the infrared region (in the range of the wavelength from 3 to 5 $\mu$m or in the range of the wavelength from 8 to 12 $\mu$m). is used, the infrared image can be picked up.

(Sixth Embodiment)

Figure 13:
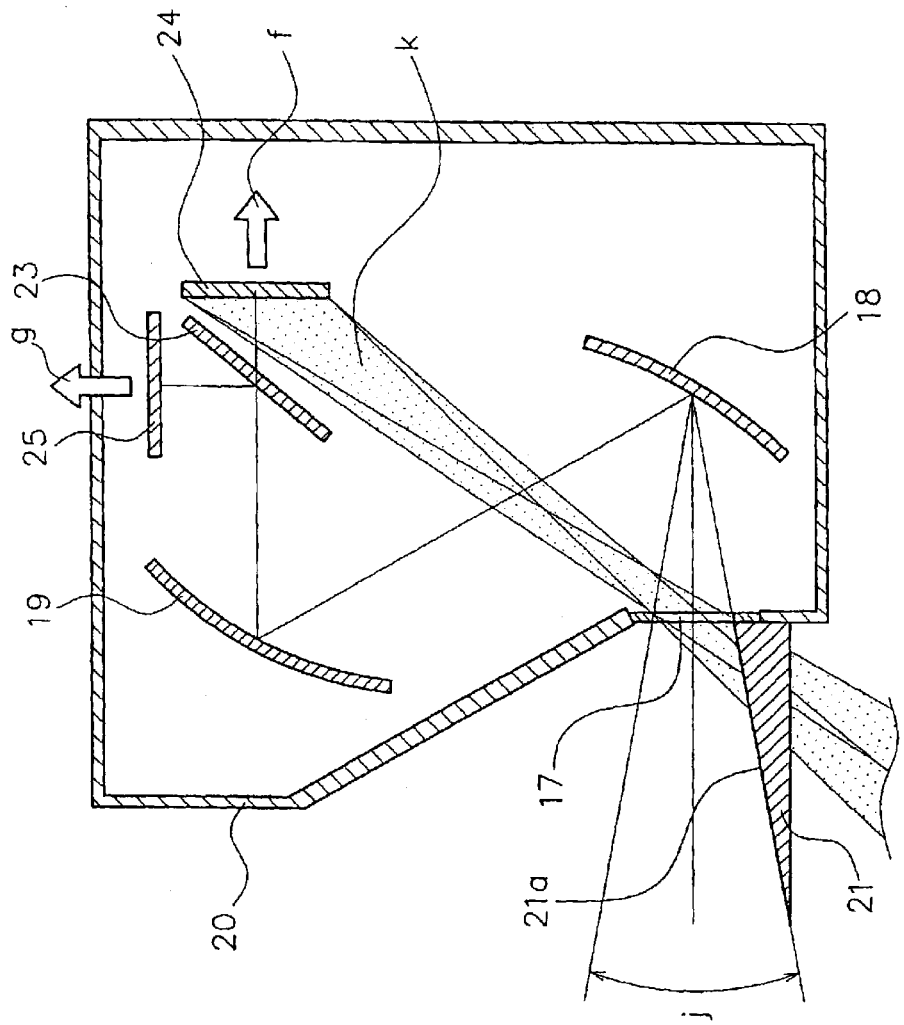
FIG. 13 is a view showing a configuration of a multi-wavelength image pickup device according to a sixth embodiment of the present invention.

FIG. 13 is a view showing a configuration of the multiwavelength pickup device according to the sixth embodiment of the present invention. In FIG. 13, the configurations represented by reference numerals 17 through 21 are the same as those in the Fifth Embodiment. In the Sixth Embodiment, a wavelength selection filter 23 that is a light flux dividing means, an infrared image pickup element 24 that is a detector for converting the light intensity into the electrical signal and a visible image pickup element 25 are provided.

The wavelength selection filter 23 transmits only light beams in the infrared range (in the range of the wavelength from 3 to 5 $\mu$m or in the range of the wavelength from 8 to 12 $\mu$m) and reflects light beams in the visible range (in the range of the wavelength from 400 to 750 $\mu$m). The infrared image pickup element 24 has sensitivity with respect to light beams in the infrared region and the visible range image pickup element 25 has the sensitivity with respect to light beams in the visible region.

The light fluxes in two wavelength bands (visible region and infrared region) released from the object are limited at the opening window 17 disposed at the location of the diaphragm, formed into a converging flux by the mirror formed of two mirrors 18 and 19, and only the light fluxes in the infrared range pass through the wavelength selection filter 23 and are imaged on the infrared image pick element 24 and a picture image that is converted into an electrical signal is output (an arrow (f)).

On the other hand, the light fluxes in the visible region reflected by the wavelength selection filter 23 form an image on the visible image pickup element 25 and the picture image that is converted into an electrical signal is output (an arrow (g)).

According to this embodiment, since the reflection optical system that is the same as that in the first embodiment is used, unnecessary light fluxes can be blocked by a light shielding plate 21 that is a means for blocking light and excellent optical image can be obtained. Furthermore, since the light fluxes in the two wavelength bands form an image by the optical system formed of only mirrors in which no color aberration occurs, for the wavelength bands of both visible region and the infrared region, an excellent optical performance can be achieved.

(Seventh Embodiment)

Figure 14:
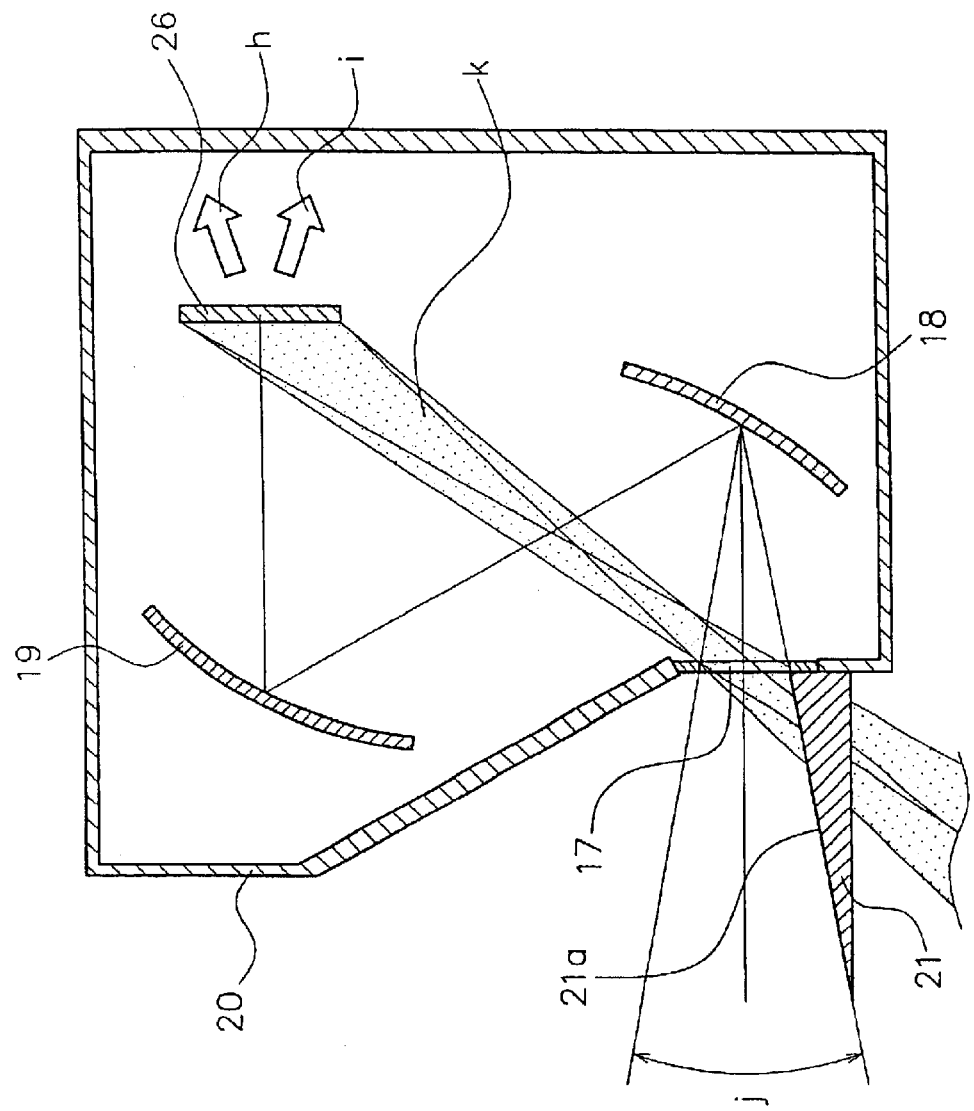
FIG. 14 is a view showing a configuration of a multi-wavelength image pickup device according to a seventh embodiment of the present invention.

FIG. 14 is a view showing a configuration of the multiwavelength pickup device according to the seventh embodiment of the present invention. In FIG. 14, the configurations represented by reference numerals 17 through 21 are the same as those in the Fifth Embodiment. In the Seventh Embodiment, a multiwavelength image pickup element 26 that is a detector having the sensitivity with respect to the light beams for both the infrared region and the visible light is provided. The multiwavelength image pickup element 26 has plural regions having sensitivity with respect to the light beams in the different wavelength bands (infrared region and visible region) in the same detecting plane.

The light fluxes in the two wavelength bands (visible region and infrared region) released from the object are limited at the opening window 17 disposed at the location of the diaphragm, and form an image on the infrared image pick element 26 by the mirror formed of two mirrors 18 and 19. Also in this embodiment, since unnecessary light fluxes are blocked by the light shielding plate 21 that is a means for blocking light, an excellent image can be obtained. Furthermore, since the light fluxes in the two wavelength bands form an image by the optical system formed of only mirrors in which no color aberration occurs, for the wavelength bands of both visible region and the infrared region, an excellent optical performance can be achieved.

Furthermore, in the multiwavelength image pickup element 26, a region having sensitivity with respect to the visible region and the region having sensitivity with respect to the infrared light region are disposed in one image pickup plane discretely. Therefore, the picture images in the two wavelength bands are converted into two kinds of electrical signals in the far infrared picture signal (an arrow (h)) and the visible region picture signal (an arrow (i)).

(Eighth Embodiment)

Figure 15:
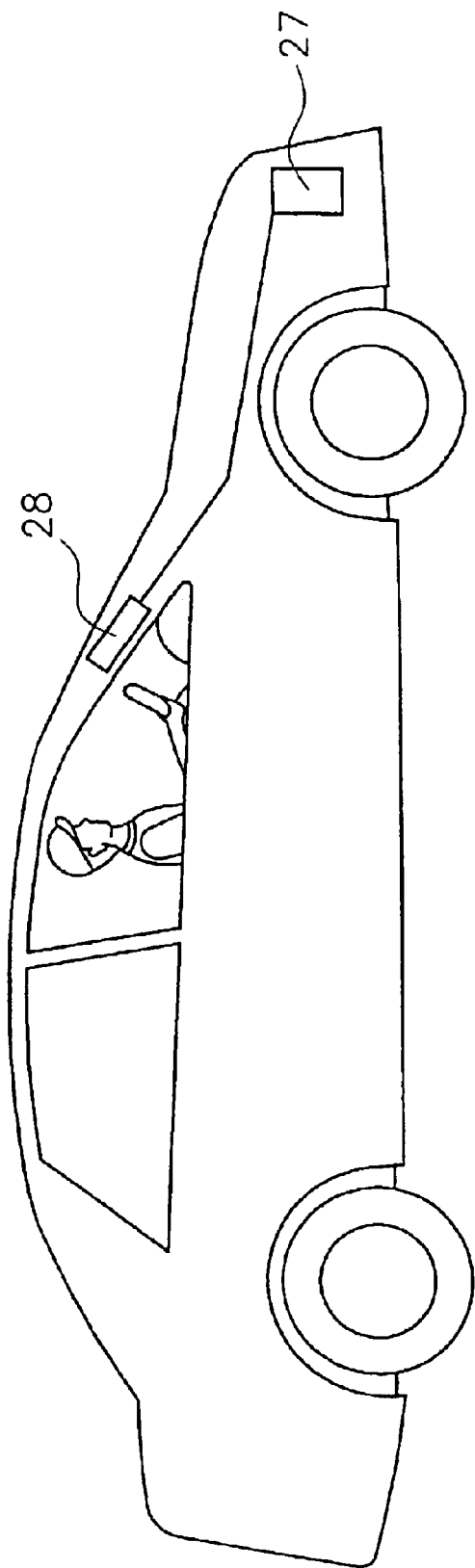
FIG. 15 is a view showing a configuration of a vehicle-mounted monitoring device according to an eighth embodiment of the present invention.

FIG. 15 is a view showing a configuration of a vehicle-mounted monitoring device according to the eight embodiment of the present invention. The vehicle-mounted monitoring device shown in FIG. 15 includes a, multiwavelength pickup device 27 and the display 28 that is a displaying means.

The picture image in the two wavelength bands (visible region and infrared region) output from the multiwavelength pickup device 27 is displayed by the display device 28 and a driver can obtain information as necessary. For example, in the case where the outside is bright in the daytime, information can be obtained mainly from the picture image by the visible light. In the nighttime, valuable information such as the location of people, vehicles, etc. can be obtained from the picture image by the infrared rays. That is, according to this embodiment, it is possible to obtain the location information of oncoming cars, people, etc. regardless of day and night with high precision.

Note here that the multiwavelength pickup device using the pickup device of the fifth embodiment and the multiwavelength pickup device of the sixth and seventh embodiments was explained as an example that is the same as in the first embodiment, however, reflection optical systems that are the same as in the second through fourth embodiments may be used.

Furthermore, the multiwavelength pickup device using the vehicle-mounted monitoring device of the eight embodiment was explained as the example of the multiwavelength pickup device that is the same as in the seventh embodiment, however, the reflection optical systems that are the same as in the second to fought embodiments may be used.

Industrial Applicability

As mentioned above, according to the reflection optical device of the present invention, the optical system is formed of the reflection surface without using a transmission surface and the reflection surfaces are disposed eccentrically. Therefore, the effective light fluxes can be guided to the image surface without being blocked. Furthermore, since a light shielding member is provided, unnecessary light fluxes do not directly reach the image surface. In addition, a refractive transmission surface is not provided, the unnecessary light reflected by the transmission does not reach the image surface. Therefore, it is possible to prevent a ghost image from being prevented easily, the device can be used for the pickup device, multiwavelength pickup device or a vehicle-mounted monitoring device.

What is claimed is:

1. A reflection optical device comprising:

plural reflection surfaces, and a diaphragm for limiting light fluxes, which is disposed between an object and a reflection surface that is located closest to the object among the plural reflection surfaces, wherein at least one of the plural reflection surfaces has an anamorphic shape, and the plural reflection surfaces are disposed eccentrically and light fluxes released from an object having a size not a spot are imaged to form an image having a size on an image surface, and, the reflection optical device comprises a light shielding member for blocking light fluxes released from a place other than the object, which would otherwise pass through the diaphragm and reach a pickup range on the image surface without being reflected by the plural reflection surfaces.

2. The reflection optical device according to claim 1, wherein the light shielding member is disposed between the object and the diaphragm.

3. The reflection optical device according to claim 2, wherein the light shielding member is a plate-shaped member having one end located at the side of the diaphragm and the other end extending toward the object.

4. The reflection optical device according to claim 3, wherein the light shielding member has an inclined surface for limiting light fluxes released from the object in the direction in which the light fluxes travel from the side of the object to the side of the diaphragm so that effective light fluxes, which form an image on the image surface, are not blocked.

5. The reflection optical device according to claim 2, wherein the light shielding member is integrated with the diaphragm.

6. The reflection optical device according to claim 1, wherein the plural reflection surfaces and the image surface are disposed inside the housing; the diaphragm is an aperture provided in the housing; and the light shielding member is disposed outside the housing.

7. The reflection optical device according to claim 1, wherein the number of the plural reflection surfaces is two; the shape of the two reflection surfaces is anamorphic; and when the two reflection surfaces are referred to as a first reflection surface and a second reflection surface in that order from the side of the object, the light shielding member is disposed in a space surrounded by an optical axis extending from the vertex of the first reflection surface to the vertex of the second reflection surface, an optical axis extending from the vertex of the second reflection surface to the center of the image surface, and a line connecting the center of the image surface and the vertex of the first reflection surface in a plane including the center of the image surface and the vertices of the two reflection surfaces.

8. The reflection optical device according to claim 7, wherein the outer shape of the light shielding member is adjusted so as not to block effective light fluxes that form an image on the image surface.

9. The reflection optical device according to claim 1, wherein the number of the plural reflection surfaces is four; and when the four reflection surfaces are referred to as a first reflection surface, a second reflection surface, a third reflection surface and a fourth reflection surface in that order from the side of the object, the light shielding member is disposed in a space surrounded by an optical axis extending from the vertex of the second reflection surface to the vertex of the third reflection surface, an optical axis extending from the vertex of the third reflection surface to the vertex of the fourth reflection surface, and a line connecting the vertex of the second reflection surface and the vertex of the fourth reflection surface in a plane including the center of the image surface and the vertices of the four reflection surfaces.

10. The reflection optical device according to claim 9, wherein the outer shape of the light shielding member is adjusted so as not to block the effective light fluxes that form an image on the image surface.

11. The reflection optical device according to claim 1, wherein the following relationship is satisfied:

$$3 \leq Wy \leq 30$$

where Wy (deg) denotes a half angle of view in the Y direction in a plane including vertices of the reflection surface in the rectangular coordinate system (X, Y) in which the X direction is a direction perpendicular to a plane including the center of the image surface and the vertices of the reflection surfaces and the Y direction is a tangential direction of the plane including vertices of the reflection surface at the vertex included in this plane.

12. The reflection optical device according to claim 9, wherein the following relationship is satisfied:

$$0.95 \leq Fno. \leq 3.1$$

where Fno. denotes an open F value in a plane including the vertices of the four reflection surfaces.

13. The reflection optical device according to claim 12, wherein the following relationship is satisfied:

$$Fno. \leq 1.9.$$

14. The reflection optical device according to claim 12, wherein the following relationship is satisfied:

$$Fno. \leq 1.6.$$

15. The reflection optical device according to claim 1, wherein the number of the plural reflection surfaces is four and the following relationships are satisfied:

$$0.95 \leq Fno. \leq 3.1$$

$$3 \leq Wy < 10$$

where Fno. denotes an open F value in a plane including the vertices of the four reflection surfaces, and Wy (deg) denotes a half angle of view in the Y direction in a plane including the vertices of the reflection surfaces in the rectangular coordinate system (X, Y) in which the X direction is a direction perpendicular to a plane including the center of the image surface and the vertices of the reflection surfaces and the Y direction is a tangential direction at a vertex included in this plane.

16. The reflection optical device according to claim 15, wherein the following relationship is satisfied:

$$Fno. \leq 1.9.$$

17. The reflection optical device according to claim 15, wherein the following relationship is satisfied:

$$Fno. \leq 1.6.$$

18. The reflection optical device according to claim 1, wherein the number of the plural reflection surfaces is four and the following relationships are satisfied:

$$1.1 \leq Fno. \leq 3.1$$

$$10 \leq Wy < 20$$

where Fno. denotes an open F value in a plane including the vertices of the four reflection surfaces, and Wy (deg) denotes a half angle of view in the Y direction in a plane including the vertices of the reflection surfaces in the rectangular coordinate system (X, Y) in which the X direction is a direction perpendicular to a plane including the center of the image surface and the vertices of the reflection surfaces and the Y direction is a tangential direction at a vertex included in this plane.

19. The reflection optical device according to claim 18, wherein the following relationship is satisfied:

$$Fno. \leq 1.9.$$

20. The reflection optical device according to claim 18, wherein the following relationship is satisfied:

$$Fno. \leq 1.6.$$

21. The reflection optical device according to claim 1, wherein the number of the plural reflection surfaces is four and the following relationships are satisfied:

$$1.4 \leq Fno. \leq 3.1$$

$$20 \leq Wy < 30$$

where Fno. denotes an open F value in a plane including the vertices of the four reflection surfaces, and Wy (deg) denotes a half angle of view in the Y direction in a plane including the vertices of the reflection surfaces in the rectangular coordinate system (X, Y) in which the X direction is a direction perpendicular to a plane including the center of the image surface and the vertices of the reflection surfaces and the Y direction is a tangential direction at a vertex included in this plane.

22. The reflection optical device according to claim 21, wherein the following relationship is satisfied:

$$Fno. \leq 1.9.$$

23. The reflection optical device according to claim 21, wherein the following relationship is satisfied:

$$Fno. \leq 1.6.$$

24. The reflection optical device according to claim 1, wherein the shape of at least one surface of the plural reflection surfaces is a free-form surface that does not have a rotational central axis.

25. An image pickup device comprising a reflection optical device according to claim 1 and a detector for converting light intensity into an electric signal.

26. The image pickup device according to claim 25, wherein the detector is a two-dimensional image pickup element.

27. The image pickup device according to claim 25, wherein the detector has sensitivity with respect to light beams in the infrared region.

28. A multiwavelength image pickup device comprising a reflection optical device according to claim 1 and a detector having sensitivity with respect to light beams in plural different wavelength bands.

29. The multiwavelength image pickup device according to claim 28, wherein the detector has a light flux dividing member for dividing light fluxes into light fluxes in different wavelength bands and detection surfaces corresponding to the plural divided wavelength bands.

30. A multiwavelength image pickup device comprising the reflection optical device according to claim 1 and the detector having plural regions, which have sensitivity with respect to light beams in different wavelength bands, in the same detecting plane.

31. A vehicle-mounted monitoring device, comprising the image pickup device according to claim 25 and a display for conveying a picked-up picture image to a driver.

32. A vehicle-mounted monitoring device, comprising the multiwavelength image pickup device according to claim 28 and a display for conveying a picked-up picture image to a driver.

* * * * *